US012537640B2

(12) United States Patent
Nishio et al.

(10) Patent No.: US 12,537,640 B2
(45) Date of Patent: Jan. 27, 2026

(54) TERMINAL, BASE STATION, AND COMMUNICATION METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 316 days.

(21) Appl. No.: 18/007,293

(22) PCT Filed: May 11, 2021

(86) PCT No.: PCT/JP2021/017810
§ 371 (c)(1),
(2) Date: Jan. 27, 2023

(87) PCT Pub. No.: WO2022/030059
PCT Pub. Date: Feb. 10, 2022

(65) Prior Publication Data
US 2023/0224112 A1 Jul. 13, 2023

(30) Foreign Application Priority Data
Aug. 6, 2020 (JP) .................................. 2020-134073

(51) Int. Cl.
*H04L 5/00* (2006.01)
*H04W 72/0453* (2023.01)

(52) U.S. Cl.
CPC ....... *H04L 5/0048* (2013.01); *H04W 72/0453* (2013.01)

(58) Field of Classification Search
CPC ................. H04B 7/01; H04B 7/18513; H04W 36/322; H04W 36/324; H04W 52/325;
(Continued)

(56) References Cited

U.S. PATENT DOCUMENTS 10,630,336 B1* 4/2020 Freiman ............ H04L 25/03828
2006/0239238 A1* 10/2006 Fernandez-Corbaton ..................
H04W 52/325
370/342

(Continued)

FOREIGN PATENT DOCUMENTS

JP 2018512786 A 5/2018

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

(Continued)

Primary Examiner — Dady Chery
(74) Attorney, Agent, or Firm — Seed Intellectual Property Law Group LLP

(57) ABSTRACT

The present invention improves transmission efficiency in wireless communication. In the present invention, a terminal comprises a reception circuit for receiving control information for adjusting an uplink transmission frequency, and a control circuit for controlling the transmission frequency on the basis of the control information.

9 Claims, 18 Drawing Sheets

(58) Field of Classification Search
CPC ........... H04W 52/0206; H04W 52/267; H04W 72/0453; H04W 56/0035; H04W 84/06; Y02D 30/70; H04L 5/0048
See application file for complete search history.

(56) References Cited

U.S. PATENT DOCUMENTS

| | | |
|---|---|---|
| 2016/0278033 A1 | 9/2016 | Wu et al. |
| 2020/0296644 A1* | 9/2020 | Logothetis ............ H04W 4/029 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; User Equipment (UE) radio transmission and reception; Part 1: Range 1 Standalone (Release 15)," 3GPP TS 38.101-1 V15.6.0, Jun. 2019. (229 pages).

3GPP, "3rd Generation Partnership Project; Technical Specification Group Radio Access Network; Solutions for NR to support non-terrestrial networks (NTN) (Release 16)," 3GPP TR 38.821 V16.0.0, Dec. 2019. (140 pages).

3GPP, "3rd Generation Partnership Project; Technical Specification Group Radio Access Network; Study on New Radio (NR) to support non-terrestrial networks (Release 15)," 3GPP TR 38.811 V15.3.0, Jul. 2020. (126 pages).

3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

International Search Report, mailed Jul. 20, 2021, for International Patent Application No. PCT/JP2021/017810. (6 pages) (with English translation).

International Telecommunication Union, "IMT Vision—Framework and overall objectives of the future development of IMT for 2020 and beyond; M Series; Mobile, radiodetermination, amateur and related satellite services," Recommendation ITU-R M.2083-0, Sep. 2015. (21 pages).

* cited by examiner

100

200

| Base station process | | Terminal frequency | |
|---|---|---|---|
| pre-compensation | post-compensation | Frequency obtained from received signal from base station | Frequency obtained by method different from reception from base station |
| No | No | A+B | B |
| Yes (correction value A) | No | B | B |
| No | Yes (correction value B) | A | Zero |
| Yes (correction value A) | Yes (correction value B) | Zero | Zero |

Downlink Doppler shift at beam center point: A (Hz),
Uplink Doppler shift at beam center point: B (Hz)

FIG. 8

| Base station process | | Non-GNSS terminal | | GNSS terminal | |
|---|---|---|---|---|---|
| pre-compensation | post-compensation | Frequency obtained from received signal from base station | Frequency obtained by method different from reception from base station | Frequency obtained from received signal from base station | Frequency obtained by method different from reception from base station |
| No | No | A+B | B | Zero | Zero |
| Yes (correction value A) | No | B | B | Minus A | Zero |
| No | Yes (correction value B) | A | Zero | Minus B | Minus B |
| Yes (correction value A) | Yes (correction value B) | Zero | Zero | Minus (A+B) | Minus B |

Downlink Doppler shift at beam center point: A (Hz),
Uplink Doppler shift at beam center point: B (Hz)

FIG. 14

TERMINAL, BASE STATION, AND COMMUNICATION METHOD

TECHNICAL FIELD

The present disclosure relates to a terminal, a base station, and a communication method.

BACKGROUND ART

In the standardization of 5G, New Radio access technology (NR) was specified in 3GPP and the Release 15 (Rel. 15) specification for NR was published.

CITATION LIST

Non-Patent Literature

NPL 1
3GPP, TR38.821 V16.0.0, "Solutions for NR to support non-terrestrial networks (NTN) (Release 16)," 2019-12
NPL 2
30PP, TR38.811 V15.3.0, "Study on New Radio (NR) to support non-terrestrial networks (Release 15)," 2020-07

SUMMARY OF INVENTION

However, in a radio communication system, there is scope for further study on a method for improving uplink transmission efficiency.

One non-limiting and exemplary embodiment of the present disclosure facilitates providing a terminal, a base station, and a communication method capable of improving uplink transmission efficiency.

A terminal according to one exemplary embodiment of the present disclosure includes: reception circuitry, which, in operation, receives control information for adjusting a transmission frequency of transmission in an uplink; and control circuitry, which, in operation, performs a control on the transmission frequency based on the control information.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one exemplary embodiment of the present disclosure, it is possible to improve transmission efficiency in radio communication.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 8 is a diagram illustrating one example of frequency control information according to Embodiment 1:
FIG. 14 illustrates one example of frequency control information according to Embodiment 2.

DESCRIPTION OF EMBODIMENTS

Hereinafter, embodiments of the present disclosure will be described in detail with reference to the drawings.

Rel. 15 is, for example, a specification related to a radio access technique for a terrestrial network. Meanwhile, in NR, extension to Non-Terrestrial Networks (NTNs) such as communications using a satellite or a High-altitude platform station (HAPS) is considered (e.g., see Non-Patent Literature (hereinafter referred to as "NPL") 1).

In an NTN environment, a satellite's coverage area (e.g., one or more cells) for a terrestrial terminal or a terminal installed in an aircraft is formed, for example, by beams transmitted by the satellite. For example, a cell similar to a terrestrial cellular network may be formed by a plurality of beams transmitted by a satellite.

In 5G NR, a terminal (e.g., a user equipment (UE)) may receive, for example, a downlink synchronization signal (e.g., a Primary Synchronization Signal (PSS) and a Secondary Synchronization Signal (SSS)) and synchronize a timing/frequency (e.g., a carrier frequency) with that of a base station (e.g., a gNB). Furthermore, the terminal may perform uplink transmission based on, for example, the synchronized timing and frequency. The terminal may perform uplink and downlink data communication, for example, after performing a random access procedure such as Physical Random Access Channel (PRACH) transmission as an initial access.

In the NTN, for example, when a Low Earth Orbit (LEO) satellite (or non-stationary satellite) is used, an extremely large Doppler shift may occur because the satellite move at a velocity of, for example, about 7.6 km/s relative to the ground. The Doppler shift is a value depending on, for example, the relative position and the moving direction of a transmission/reception point. Thus, the Doppler shift may be determined (e.g., calculated) based on information such as the position of the satellite, the orbit of the satellite, the position of a beam, or the position of the terminal.

Figure 1:
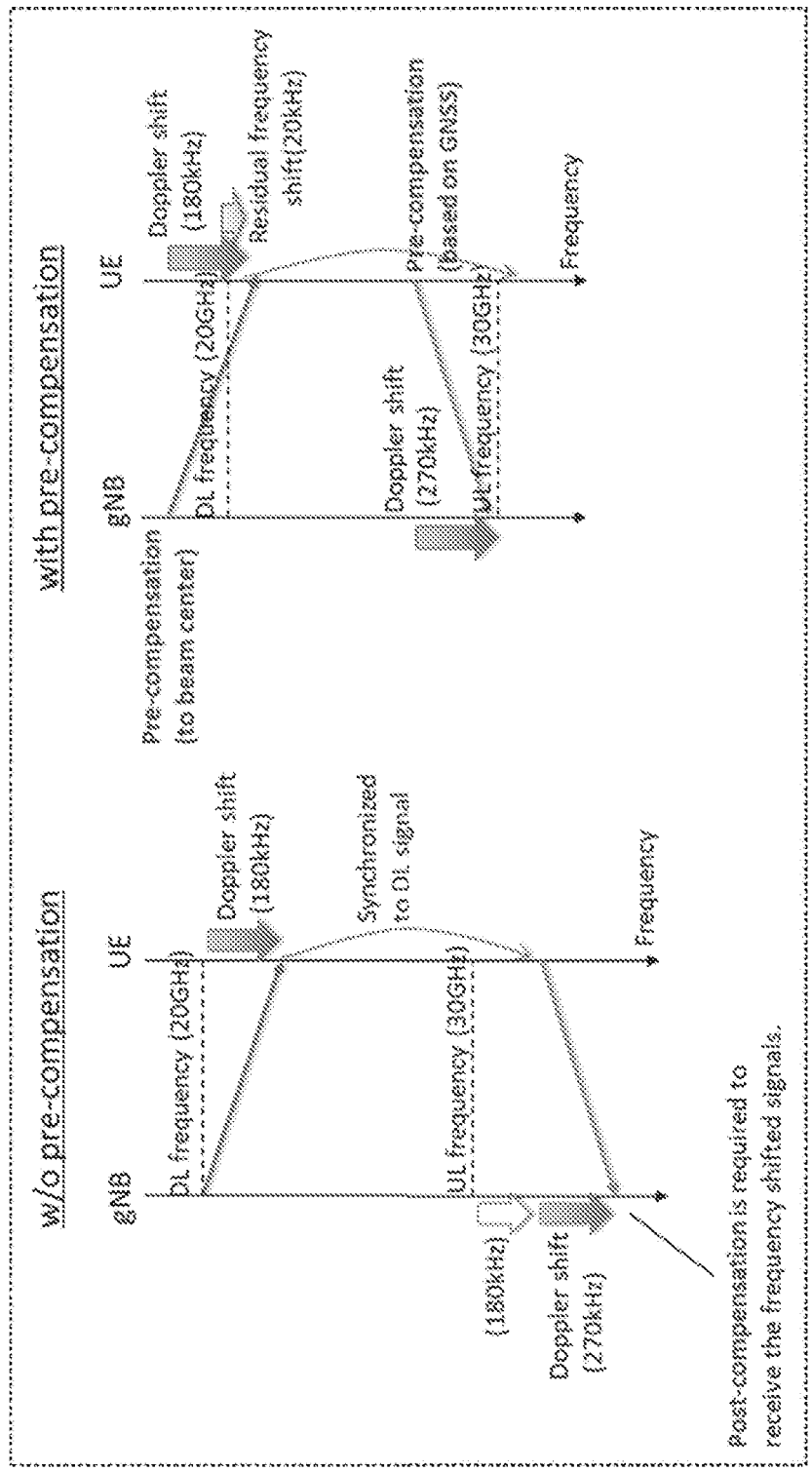
FIG. 1 illustrates one example of Pre-compensation and Post-compensation.

For example, "Pre-compensation" and "Post-compensation" have been studied as methods for correcting a frequency depending on the Doppler shift (see, for example, NPL 1). FIG. 1 is a diagram illustrating exemplary "Pre-compensation" and "Post-compensation." For example, as illustrated in FIG. 1, "Pre-compensation" is a method in which a Doppler shift is estimated at a transmitter side (a base station (gNB) in FIG. 1) and a transmission (a downlink transmission in FIG. 1) is performed at a frequency corrected based on the estimated Doppler shift. Further, as illustrated in FIG. 1, for example, "Post-compensation" is a method in which a Doppler shift is estimated at a receiver side and received at a frequency corrected based on the estimated Doppler shift (an uplink reception in FIG. 1).

Here, the Doppler shift amount depends on, for example, a carrier frequency (or a carrier-wave frequency). For this reason, in the case of a Frequency Division Duplex (FDD) system where carrier frequencies different between the downlink and uplink are used, the Doppler shift amount may be different between the downlink and uplink, for example. By way of one example, in FIG. 1, the downlink Doppler shift amount is 180 kHz, and the uplink Doppler shift amount is 270 kHz.

For example, multiplexing transmission to a plurality of terminals may be performed at the base station side (or the satellite side). For this reason, there is a possibility that Pre-compensation or Post-compensation common to a plurality of terminals is performed by beams of the satellite.

Figure 2:
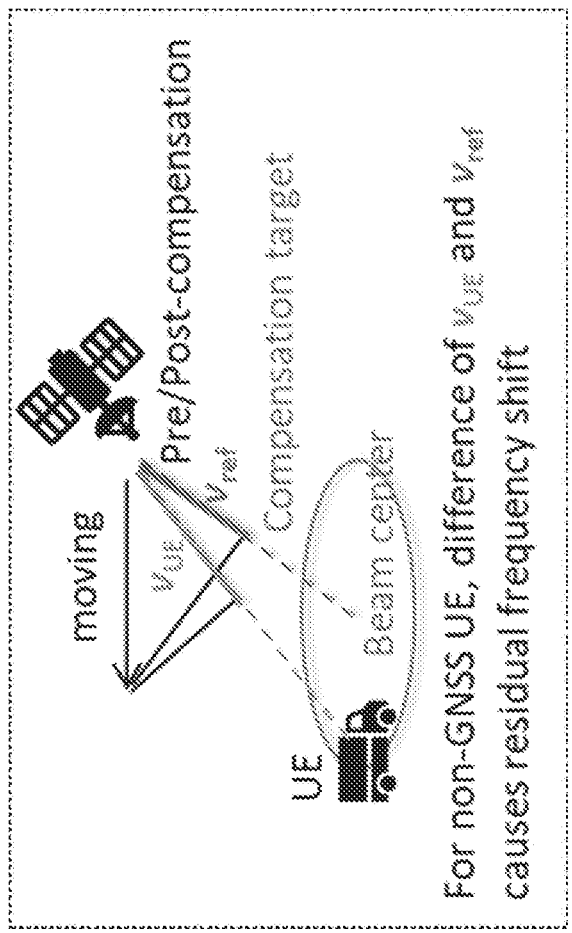
FIG. 2 is a diagram illustrating one example of Pre-compensation and Post-compensation common to a plurality of terminals.

FIG. 2 is a diagram illustrating one example of Pre-compensation and Post-compensation common to a plurality of terminals.

In the common Pre-compensation or Post-compensation, for example, transmission or reception may be performed at a frequency for which the Doppler shift at a location near the center (e.g., beam center) of a satellite beam (or cell) is corrected (or compensated). For this reason, for example, at a terminal located away from the center position of the satellite beam (e.g., a reference point), a frequency shift (hereinafter referred to as "residual frequency shift") depending on the distance between the center position of the satellite beam and the position of the terminal (or the position of the terminal in the satellite beam or the cell) may be observed for the frequency corrected by the Pre-compensation or Post-compensation. For example, the higher the residual frequency shift for the terminal, the more likely the reception performance is to deteriorate. For example, the larger the size of the satellite beam (in other words, the coverage area), the greater the residual frequency shift caused may be.

Among terminals, there may be a terminal (e.g., referred to as "GNSS terminal") which has (or supports) Global Navigation Satellite System (GNSS) functionality, for example. For example, the GNSS terminal is capable of calculating a Doppler shift based on the positional information of the GNSS terminal and satellite orbital information (e.g., satellite ephemeris), and correcting the frequency in advance at the time of transmission. In addition, the GNSS terminal is capable of obtaining a frequency with higher precision by, for example, the GNSS than the precision of an oscillator of the terminal. In this case, the base station does not need to perform the Post-compensation, for example.

On the other hand, it is difficult to obtain a frequency with higher accuracy than that of the GNSS when a frequency is obtained by the oscillator of the terminal which does not have (or does not support) GNSS functionality (for example, referred to as a "non-GNSS terminal"). Therefore, it is difficult for the non-GNSS terminal to perform frequency correction such as that performed by the GNSS terminal, for example. In this case, correction on the Doppler shift for the Non-GNSS terminal may be performed at the base station side by, for example, Post-compensation. It is also conceivable that even the terminal having the GNSS functionality obtains a frequency synchronized with a signal transmitted by the base station without frequency obtainment via the GNSS.

However, in this case, the frequency of uplink transmission (e.g., frequency shift) may be different between the non-GNSS terminal and the GNSS terminal, and thus it may be difficult for the base station to receive a signal in which a signal of the GNSS terminal and a signal of the non-GNSS terminal are multiplexed. For example, when it is difficult to multiplex the signal of the GNSS terminal and the signal of the non-GNSS terminal, a constraint on a scheduler in the base station or the complexity of processing of the base station may increase. For this reason, for example, in a radio communication system in which the non-GNSS terminals and the GNSS terminals coexist, it is expected to perform frequency correction matching between the base station and the terminals.

In view of the above, one exemplary embodiment of the present disclosure will be described in relation to a method for appropriately controlling (e.g., determining or adjusting) an uplink frequency in a radio communication system. By appropriately controlling the uplink frequency, for example, in the radio communication system in which the non-GNSS terminals and the GNSS terminals coexist, it is possible to perform frequency correction matching between the base station and the terminals.

Embodiment 1

Overview of Radio Communication System

A radio communication system according to one embodiment of the present disclosure includes, for example, at least terminal 100 and base station 200. The radio communication system may be, for example, a satellite-based communication system in the NTN environment, or another radio communication system.

For example, terminal 100 may be a GNSS terminal or a Non-GNSS terminal. In addition, base station 200 may communicate with terminal 100 via a satellite, for example.

For example, base station 200 may transmit (e.g., indicate or broadcast) to terminal 100 frequency control information including a frequency adjustment value for correcting a Doppler shift. Terminal 100 may perform a control on a frequency (for example, adjust a frequency) based on the frequency control information being from base station 200, and transmit an uplink signal. Note that, in the following description, "adjustment" may be exchanged by "calibration" or "correction."

Here, the frequency adjustment value configured by base station 200 may be determined based on, for example, at least one of the position of the satellite, the moving direction of the satellite, the beam center position on the earth surface, and a frequency obtainment method of terminal 100. In the present embodiment, for example, Doppler shift correction that is common (in other words, common to the cell, specific to the cell, common to the beam, or specific to the beam) to a plurality of terminals 100 within a cell or beam may be performed.

Figure 3:
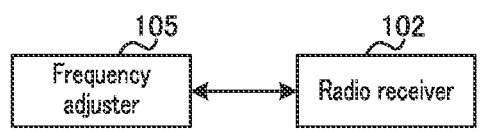
FIG. 3 is a block diagram illustrating a configuration of a part of a terminal according to Embodiment 1.

FIG. 3 is a block diagram illustrating a configuration example of a part of terminal 100 according to the embodiment of the present disclosure. In terminal 100 illustrated in FIG. 3, radio receiver 102 (for example, corresponding to the reception circuitry) receives control information for adjusting an uplink transmission frequency. Frequency adjuster 105 (corresponding to, for example, the control circuitry) controls the uplink transmission frequency based on the control information.

Figure 4:
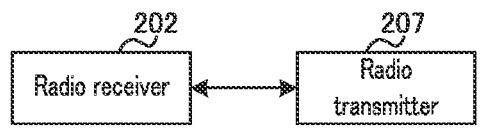
FIG. 4 is a block diagram illustrating a configuration of a part of a base station according to Embodiment 1.

FIG. 4 is a block diagram illustrating a configuration example of a part of base station 200 according to the embodiment of the present disclosure. In base station 200 illustrated in FIG. 4, radio transmitter 207 (e.g., corresponding to the transmission circuitry) transmits control information relevant to an uplink transmission frequency. Radio receiver 202 receives an uplink signal at an uplink transmission frequency determined by control based on the control information.

Configuration of Terminal 100

Figure 5:
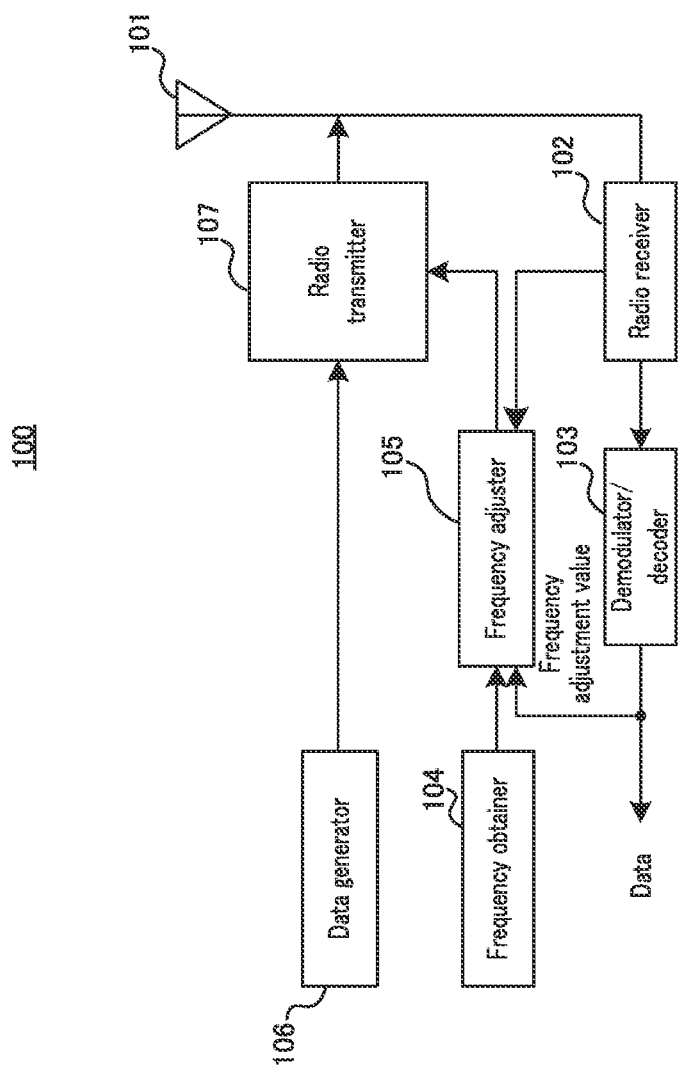
FIG. 5 is a block diagram illustrating one example of a configuration of the terminal according to Embodiment 1.

FIG. 5 is a block diagram illustrating an exemplary configuration of terminal 100 (for example, a GNSS terminal or a Non-GNSS terminal).

Terminal 100 illustrated in FIG. 5 includes, for example, antenna 101, radio receiver 102, demodulator/decoder 103, frequency obtainer 104, frequency adjuster 105, data generator 106, and radio transmitter 107.

Note that, for example, demodulator/decoder 103, frequency obtainer 104, frequency adjuster 105, and data generator 106 illustrated in FIG. 5 correspond to a controller (or control circuitry), and antenna 101, radio receiver 102, and radio transmitter 107 illustrated in FIG. 5 may correspond to a communicator (or communication circuitry).

Radio receiver 102 performs radio reception processing such as down-conversion and A/D conversion on the signal received from base station 200 via antenna 101, for example. For example, radio receiver 102 outputs to demodulator/decoder 103 the received signal after the radio reception processing.

Further, for example, radio receiver 102 may perform time-domain (e.g., timing) and frequency-domain (e.g., carrier frequency) synchronization processing based on a synchronization signal (e.g., PSS and SSS) received from base station 200. For example, radio receiver 102 may determine (or obtain, generate) a frequency synchronized with the frequency of the received signal from base station 200. Radio receiver 102 may output, for example, frequency information about the determined frequency to frequency adjuster 105.

For example, demodulator/decoder 103 demodulates and decodes a received signal (for example, a downlink signal) inputted by radio receiver 102.

The downlink signal may include, for example, a downlink control channel (e.g., PDCCH: Physical Downlink Control Channel) and a downlink data channel (e.g., PDSCH: Physical Downlink Shared Channel). The PDCCH may include, for example, PDSCH allocation information and uplink data channel (e.g., PUSCH: Physical Uplink Shared Channel) allocation information. The PDSCH may also include, for example, information such as system information (e.g., SIB: System Information Block), higher layer information (e.g., Radio Resource Control (RRC) control information, Medium Access Control (MAC) information (e.g., MAC Control Element (CE) control information), random access response information (e.g., Random Access Channel (RACH) response, or msg2) in addition to user data.

For example, the SIB may include frequency control information (e.g., frequency adjustment value) for correcting the Doppler shift in terminal 100. The frequency control information may be, for example, control information on an uplink transmission frequency based on at least one of the downlink and the uplink (for example, control information for adjusting the uplink transmission frequency). For example, the frequency control information may include information on a Doppler shift in at least one of the downlink and the uplink (e.g., a frequency adjustment value). Note that the frequency control information may be included in other control information than the SIB.

For example, demodulator/decoder 103 may output the control information including the frequency adjustment value to frequency adjuster 105.

Frequency obtainer 104 may obtain the frequency of uplink transmission from a crystal oscillator or the like. Further, for example, frequency obtainer 104 may obtain the frequency of the uplink transmission based on other information different from a received signal from base station 200. For example, frequency obtainer 104 may output the frequency information relevant to the obtained frequency to frequency adjuster 105.

The obtainment method of frequency obtainer 104 for obtaining a frequency may, for example, be one or more of the following methods:

(1) Obtainment from signals from one or more satellites being communication partner(s) of terminal 100;

(2) Obtainment from television or radio broadcasting;

(3) Obtainment from a highly accurate clock such as an atomic clock or from a built-in oscillator of terminal 100;

(4) Obtainment from another terminal through a sidelink; and (5) Obtainment from a clock distribution system such as in IEEE1588.

Note that the frequency obtainment method in frequency obtainer 104 is not limited to the above (1) to (5), and may be another method based on information different from the received signal from base station 200.

When terminal 100 is a GNSS terminal, frequency obtainer 104 may obtain the frequency from the GNSS functionality, for example.

Frequency adjuster 105 may control (e.g., adjust or determine) the frequency (or carrier frequency) of the uplink transmission, for example. For example, frequency adjuster 105 may determine the frequency (e.g., MHz) of uplink transmission by performing frequency adjustment (e.g., increasing/decreasing the frequency or by shifting the frequency) based on the frequency adjustment value (e.g., frequency shift value or frequency correction value) indicated in the frequency control information inputted by demodulator/decoder 103 for the frequency based on at least one of the frequency information inputted by radio receiver 102 and the frequency information inputted by frequency obtainer 104. For example, frequency adjuster 105 may output information on the determined frequency to radio transmitter 107.

Data generator 106 may generate, for example, an uplink signal (for example, an uplink transmission data sequence). For example, data generator 106 may output the generated signal to radio transmitter 107.

For example, data generator 106 may perform coding and modulation based on resources (for example, time resources and frequency resources) allocated by base station 200, a coding rate, and a modulation scheme (for example, MCS: Modulation and Coding Scheme), and generate a modulated signal. Note that the information on the allocated resources and the information on the MCS may be indicated to terminal 100 by, for example, downlink control information (for example, PDCCH or Downlink Control Information (DCI)) (also referred to as Dynamic grant), or may be indicated to terminal 100 by higher layer signaling (for example, RRC signaling) (also referred to as Configured grant).

In addition, data generator 106 may generate a reference signal such as a PRACH for initial access (also referred to as a PRACH preamble or msg.1) or a Sounding Reference Signal (SRS), for example.

For example, radio transmitter 107 performs radio transmission processing such as D/A conversion, up-conversion, and amplification on the signal inputted by data generator 106, and transmits the radio signal after the radio transmission processing via antenna 201. For example, radio transmitter 107 may determine the carrier frequency based on the information on the frequency inputted by frequency adjuster 105.

Base Station Configuration

Figure 6:
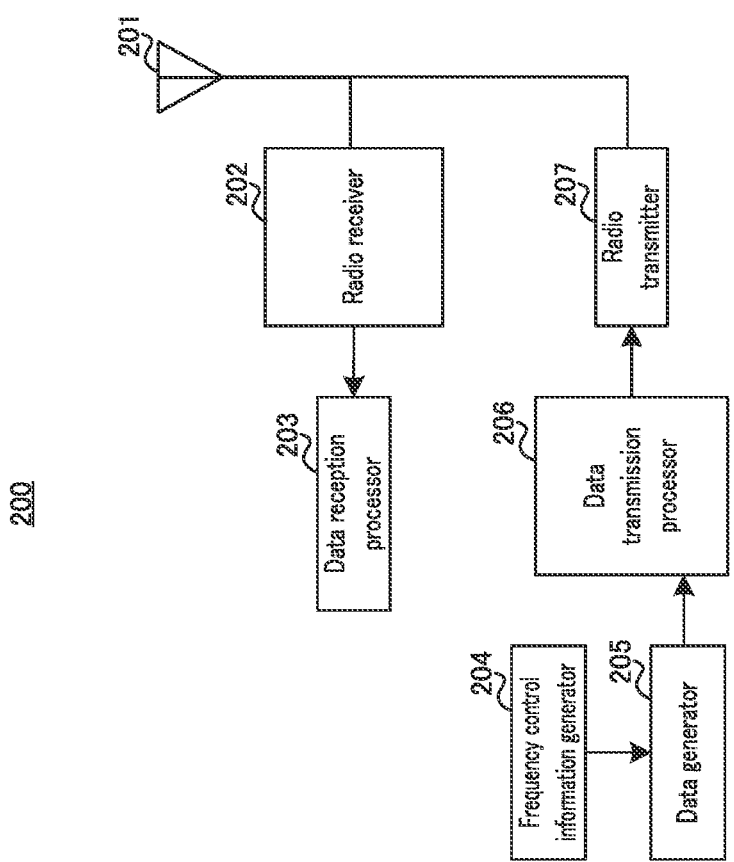
FIG. 6 is a block diagram illustrating one example of a configuration of the base station according to Embodiment 1.

FIG. 6 is a block diagram illustrating a configuration example of base station 200.

Base station 200 illustrated in FIG. 6 includes, for example, antenna 201, radio receiver 202, data reception processor 203, frequency control information generator 204, data generator 205, data transmission processor 206, and radio transmitter 207.

Note that, for example, data reception processor 203, frequency control information generator 204, data generator 205, and data transmission processor 206 illustrated in FIG. 6 correspond to a controller (or control circuitry), and antenna 201, radio receiver 202, and radio transmitter 207 illustrated in FIG. 6 may correspond to a communicator (or communication circuitry).

For example, radio receiver 202 performs radio reception processing such as down-conversion and A/D conversion on a signal received from terminal 100 via antenna 201, and outputs to data reception processor 203 the received signal after the radio reception processing. The signal from terminal 100 may include, for example, data (e.g., PUSCH) or a PRACH signal.

For example, radio receiver 202 may receive an uplink signal using an uplink configured frequency (or a carrier frequency), and may also receive an uplink signal using a frequency shifted from the configured frequency in order to compensate (e.g., post-compensation) an uplink Doppler shift occurring due to movement of a satellite.

For example, data reception processor 203 may perform reception processing such as channel estimation, demodulation, and decoding on the received signal (for example, received data) from each terminal 100 inputted by radio receiver 202, and obtain received data.

Frequency control information generator 204 may generate, for example, information (frequency control information) relevant to control on a frequency (for example, a carrier frequency) common to a cell or a beam. The frequency control information may be generated based on, for example, a Doppler shift amount calculated based on at least one of the position of the satellite, the moving direction of the satellite, the velocity of the satellite, and the beam center position on the earth surface. Further, for example, frequency control information generator 204 may generate the frequency control information for each of the GNSS terminal and the non-GNSS terminal. Frequency control information generator 204 may output the generated frequency control information to data generator 205.

Data generator 205 may generate, for example, a downlink data signal in which data including at least one of user data, a synchronization signal, system information (for example, broadcast information), terminal-specific control information (for example, RRC control information), and MAC control information for each terminal 100 is multiplexed. For example, data generator 205 may output the generated downlink data signal to data transmission processor 206. The generated downlink data signal may include, for example, the frequency control information inputted by frequency control information generator 204.

For example, data transmission processor 206 encodes and modulates the downlink data signal (e.g., including frequency control information) inputted by data generator 205, and outputs the modulated signal to radio transmitter 207.

For example, radio transmitter 207 performs radio transmission processing such as D/A conversion, up-conversion, and amplification on the signal inputted by data transmission processor 206, and transmits the radio signal after the radio transmission processing via antenna 201.

For example, radio transmitter 207 may transmit a downlink signal using a configured frequency for the downlink, or may transmit a downlink signal using a frequency shifted from the configured frequency in order to compensate (e.g., pre-compensation) a downlink Doppler shift occurring due to movement of a satellite.

[Exemplary Operation of Terminal 100 and Base Station 200]

An exemplary operation of terminal 100 and base station 200 described above will be described.

Figure 7:
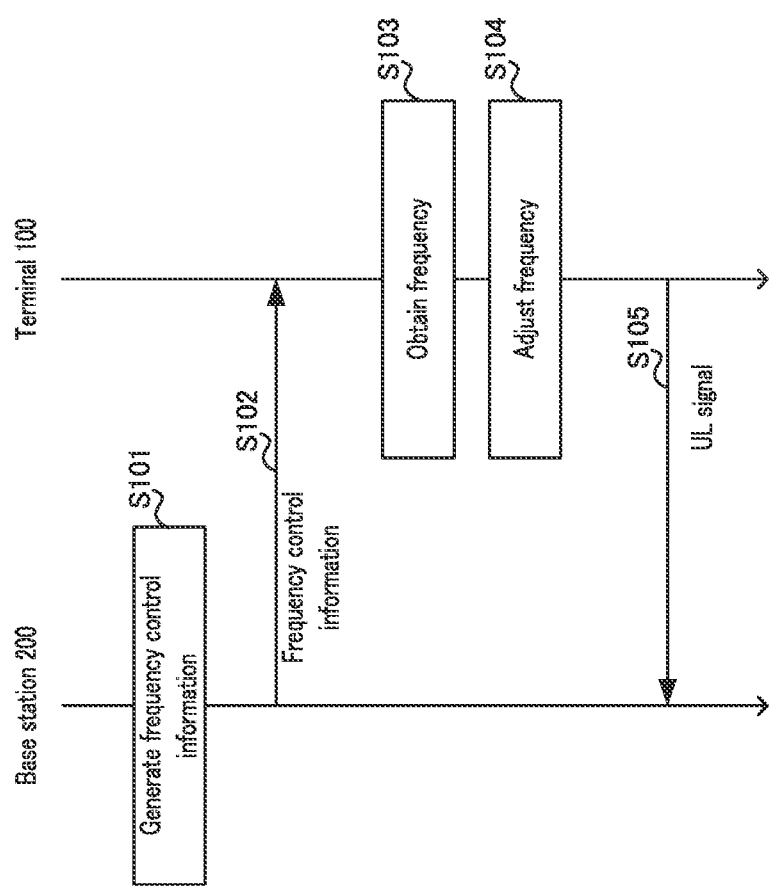
FIG. 7 is a sequence diagram illustrating an exemplary operation of a terminal and a base station according to Embodiment 1.

FIG. 7 is a sequence diagram illustrating an exemplary operation of terminal 100 and base station 200.

In FIG. 7, base station 200 may generate the frequency control information (S101), for example. Base station 200 may, for example, configure the frequency adjustment value in the frequency control information to compensate a Doppler shift caused by the movement of a satellite.

Here, the Doppler shift amount caused by the movement of the satellite depends on, for example, the relative velocity of a transmission/reception point. Thus, base station 200 may determine (e.g., calculate) the Doppler shift amount at the reference point based on, for example, the position of the satellite, the moving direction of the satellite, and the coordinates of the reference point (or reference location) on the earth surface (or sky) or the direction of the center of satellite beam directivity (or the angle from the earth surface direction). Note that, in the following description, "calculation" may be replaced with "determination."

Further, since the frequency control information is information common to the cell or the satellite beam, for example, a center point of the cell or the satellite beam may be configured as the reference point. Note that the reference point relevant to the frequency control information is not limited to the center point of the cell or the satellite beam, and may be another point.

Base station 200 may transmit downlink data including the frequency control information to terminal 100 (S102), for example.

Terminal 100 may obtain a carrier frequency (S103), for example. For example, terminal 100 may obtain the frequency based on a downlink signal received by terminal 100 from base station 200, or may obtain the frequency from an external device different from base station 200. For example, terminal 100 may obtain the frequency based on the GNSS functionality or at least one of (1) to (5) described above.

Note that the process of S102 and the process of S103 may be reversed in order.

For example, terminal 100 may adjust the obtained frequency based on the frequency control information indicated by base station 200 (S104). For example, terminal 100 may determine the frequency of uplink transmission by the frequency shift performed on the obtained frequency based on the frequency adjustment value indicated by base station 200.

Terminal 100 may transmit an uplink signal at the adjusted frequency (S105), for example.

Thus, the transmission signal from each terminal 100 is received at base station 200 as a signal having a frequency obtained by correcting an average Doppler shift in the beam caused by the movement of the satellite. In other words, base station 200 configures the frequency adjustment value such that, for example, a signal transmitted by each terminal 100 is received as a signal having a frequency obtained by correcting an average Doppler shift in the beam caused by the movement of the satellite. By controlling the frequency, terminal 100 and base station 200 are capable of performing communication in which the influence of the Doppler shift is reduced.

Hereinafter, a configuration example of the frequency control information in base station 200 will be described.

For example, base station 200 may configure the frequency control information (for example, the frequency adjustment value) based on at least one of a transmission method and a reception method in base station 200 (or a satellite).

FIG. 8 is a diagram summarizing the configuration example of the frequency control information to be described later. FIG. 8 illustrates one exemplary correspondence between, on one hand, a combination between a process performed by base station 200 (for example, whether or not the pre-compensation and post-compensation are applied) and the frequency obtainment method performed by terminal 100 and, on the other hand, the frequency control information (for example, the frequency adjustment value).

For example, when the pre-compensation is applied in base station 200 and the post-compensation is not applied (for example, when a downlink signal is transmitted at a frequency corrected for a downlink Doppler shift (for example, A [Hz])), a value (for example, correction value B) for correcting an uplink Doppler shift may be configured as the frequency adjustment value. In other words, in this case, the frequency adjustment value does not have to include a value (for example, correction value A) for correcting the downlink Doppler shift.

Further, for example, when neither the pre-compensation nor the post-compensation are applied in base station 200, a value (for example, a correction value (A+B)) for correcting both the uplink and downlink Doppler shifts may be configured as the frequency adjustment value.

Further, for example, in a case where the pre-compensation is not applied but the post-compensation is applied in base station 200 (for example, in a case where an uplink signal is received at a frequency corrected for an uplink Doppler shift (for example, B [Hz])), a value (for example, correction value A) for correcting a downlink Doppler shift may be configured as the frequency adjustment value. In other words, in this case, the frequency adjustment value does not have to include the value (for example, correction value B) for correcting the uplink Doppler shift.

Also, for example, when both the pre-compensation and post-compensation are applied in base station 200, or when Post-compensation for correcting both the downlink and uplink Doppler shifts is applied, the frequency adjustment value may be configured to zero, or the frequency control information does not have to be transmitted to terminal 100.

In addition, base station 200 may configure the frequency control information based on, for example, a frequency source (in other words, the frequency obtainment method) used at the terminal 100 side.

For example, when terminal 100 obtains a frequency based on a received signal from base station 200, the frequency of the received signal from base station 200 is a frequency affected by a downlink Doppler shift (for example, A [Hz]). Thus, the frequency adjustment value may include the value (for example, correction value A) for correcting the downlink Doppler shift.

Further, for example, when terminal 100 obtains a frequency from an external device different from base station 200 by the GNSS functionality or at least one of (1) to (5) described above, a frequency not affected by a downlink Doppler shift (for example, A [Hz]) can be used. Therefore, a value (for example, correction value B) for correcting an uplink Doppler shift is configured as the frequency adjustment value, and a value (for example, correction value A) for correcting a downlink Doppler shift does not have to be included as the frequency adjustment value.

Further, for example, when both the downlink Doppler shift and the uplink Doppler shift are to be corrected, a value for correcting the downlink Doppler shift and a value for correcting the uplink Doppler shift may be included.

Note that, for example, the frequency control information may be different between a GNSS terminal (for example, the first-type terminal) and a non-GNSS terminal (for example, the second-type terminal). For example, when the GNSS terminal obtains the frequency by the GNSS functionality and the non-GNSS terminal obtains the frequency from the received signal from base station 200, base station 200 may indicate terminal 100 of the frequency adjustment value for correcting the uplink Doppler shift for the GNSS terminal and the frequency adjustment value for correcting the downlink and uplink Doppler shifts for the non-GNSS terminal.

Also, base station 200 may transmit (e.g., broadcast or indicate) information specifying a frequency source used by terminal 100, for example. For example, base station 200 transmits information indicating whether terminal 100 uses a frequency synchronized with a downlink received signal or uses a frequency obtained by other means. Accordingly, it is possible to suppress processing mismatch related to the transmission frequency between terminal 100 and base station 200. For example, when a high-precision frequency obtained by base station 200 by means of the GNSS is used, a method for terminal 100 to obtain a frequency with the same accuracy as that obtained by base station 200 may be specified.

Further, for example, base station 200 may indicate terminal 100 of the frequency control information (for example, the frequency adjustment value) corresponding to each of a plurality of frequency sources with different accuracies. Terminal 100 may use any frequency adjustment value according to implementation of terminal 100, for example.

As described above, terminal 100 is indicated of the frequency control information corresponding to the terminal type (for example, the GNSS terminal or the non-GNSS terminal) based on the frequency source used in terminal 100. Accordingly, terminal 100 is capable of appropriately correcting the Doppler shift.

Further, for example, when the GNSS terminal obtains the frequency by the GNSS functionality and the non-GNSS terminal obtains the frequency from an external device different from base station 200 by at least one of the above-described (1) to (5), base station 200 may indicate the frequency adjustment value for correcting the uplink Doppler shift available for both terminals 100 including the GNSS terminal and the non-GNSS terminal, and does not have to indicate the frequency adjustment value for correcting the downlink Doppler shift. As is understood, the GNSS terminal obtains the frequency by the GNSS functionality, and the non-GNSS terminal obtains the frequency by at least one of the above-described (1) to (5). Accordingly, the common frequency control information only needs to be indicated to both terminals 100, and thus the notification information amount can be reduced.

Figure 9:
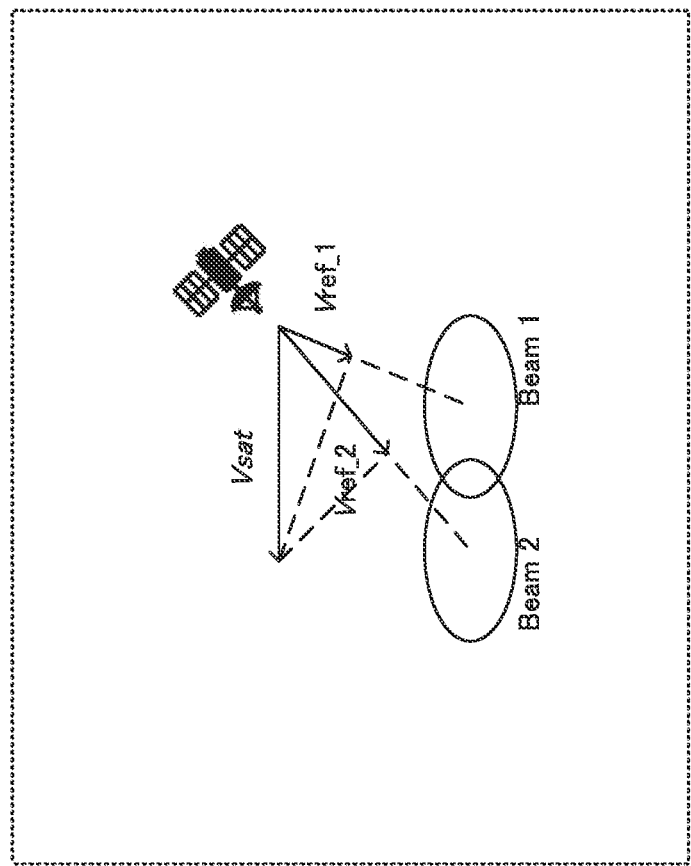
FIG. 9 is a diagram illustrating one example of a satellite beam according to Embodiment 1.

In addition, base station 200 may, for example, indicate the frequency control information for each satellite beam. FIG. 9 is a diagram illustrating an example in which two satellite beams are transmitted by a satellite. In FIG. 9, base station 200 may, for example, indicate terminal 100 of frequency adjustment values for correcting Doppler shifts caused by relative velocities Vref_1 and Vref_2 between the centers of respective satellite beams (Beam 1 and Beam 2) and the satellite. The frequency control information for each satellite beam may include, for example, a difference from a value common to the satellite beams. In this case, for example, as the number of beams increases, the amount of information of the frequency control information can be smaller.

Further, for example, when one cell is formed by two satellite beams illustrated in FIG. 9, a frequency adjustment value for each satellite beam may be included in control information (for example, SIB) transmitted to the cell, and one frequency adjustment value for correcting a Doppler shift at a point near the middle between Beam 1 and Beam 2 may be included.

Note that, for example, when each of the satellite beams is emitted onto the earth surface at a fixed angle as viewed from the satellite, a beam center point moves with the satellite. It is thus assumed that the relationship between the position and velocity of the satellite and the beam center point does not change, and the Doppler shift does not substantially change. In this case, the fixed value may be configured in the frequency control information corresponding to each of the beams.

Meanwhile, for example, when each of the satellite beams is emitted onto the same point on the earth surface while the satellite moves (for example, when beam steering is performed), the relationship between the position and velocity of the satellite and the beam center point changes with time, and therefore, it is assumed that the Doppler shift also changes. In this case, a value for correcting the Doppler shift that varies with time may be configured in the frequency control information corresponding to each of the beams, and the amount of change in the Doppler shift (or correction value) may be configured. In addition, the amount of change (for example, a differential value of the change amount) in the amount of change in the Doppler shift (or correction value) may be configured. Base station 200 may also indicate terminal 100 of information on the coordinates of the beam center point (or a reference point for frequency correction) and terminal 100 may calculate the correction value for the Doppler shift based on the relationship between the indicated coordinates, the satellite position, and the satellite moving velocity.

Further, terminal 100 may perform the uplink transmission after correcting the frequency of uplink transmission according to the indicated frequency correction value (the frequency correction value estimated from the amount of change when the amount of change in the correction value is also indicated) when the frequency correction value is indicated as the frequency control information, or may perform the uplink transmission while calculating the correction value of the Doppler shift from the relationship between, on one hand, the indicated coordinates of the beam center point (or the reference point for the frequency correction) and, on the other hand, the satellite position and the satellite moving velocity when the information on the coordinates is indicated as the frequency control information so as to correct the frequency of the uplink transmission. In addition, when both of the frequency correction value and the information on the coordinates of the beam center point (or the reference point for the frequency correction) are indicated, terminal 100 may perform uplink transmission after correcting the frequency of the uplink transmission using both of the correction values.

As described above, according to the present embodiment, base station 200 indicates (e.g., broadcasts) terminal 100 of the frequency control information relevant to the uplink transmission frequency based on at least one of the downlink and the uplink. Each terminal 100 may perform control (e.g., frequency adjustment) on the uplink transmission frequency based on the received frequency control information. For example, base station 200 receives the uplink signal at the frequency of the uplink transmission determined by the frequency control based on the frequency control information.

For example, the smaller the size of the cell or beam, the more appropriately the Doppler shift can be corrected for each terminal 100. Thus, the effect of reducing the Doppler shift due to the satellite movement can be obtained. Further, in the present embodiment, for example, the frequency control information common to the plurality of terminals 100 is broadcast for each cell or beam. Accordingly, an increase in the amount of information of the frequency control information due to an increase in the number of terminals 100 can be suppressed, and overhead can be reduced.

Thus, for example, the GNSS terminal and the non-GNSS terminal can individually control the correction of the Doppler shift, and thus can appropriately correct the Doppler shift. Thus, base station 200 can receive, for example, a signal in which the GNSS terminal and the non-GNSS terminal are multiplexed. Therefore, according to the present embodiment, it is possible to reduce the constraint on the scheduler of base station 200 or the complexity of processing in base station 200. In other words, for example, in the radio communication system in which the non-GNSS terminals and the GNSS terminals coexist, it is possible to perform frequency correction matching between base station 200 and terminals 100.

In addition, the appropriate Doppler shift correction can be performed at each terminal 100 even in the case of satellite beam operation in which each satellite beam is emitted onto the earth surface at a fixed angle as viewed from the satellite (that is, the satellite beam moves on the earth surface according to the movement of the satellite) and even in the case of satellite beam operation in which each satellite beam is emitted onto the same point on the earth surface while the satellite moves (for example, in the case of beam steering).

Therefore, according to the present embodiment, it is possible to improve uplink transmission efficiency in the radio communication system.

Note that, the present embodiment has been described in relation to the case in which terminal 100 performs the process of obtaining a frequency based on a downlink signal from base station 200 and the process of obtaining a frequency from an external device different from base station 200. However, the present disclosure is not limited thereto, and a frequency may be obtained based on any one of the obtainment methods.

Embodiment 2

In the present embodiment, as in Embodiment 1, the frequency control information is indicated (or broadcast) by the base station to the terminal, and the terminal performs frequency adjustment based on the frequency control information from the base station and transmits an uplink signal. In the present embodiment, the correction of a Doppler shift occurring depending on the position of the terminal in an area of a cell or a beam (for example, the distance between the center position of the beam and the terminal position) is further performed. In other words, in the present embodiment, common Doppler shift correction is performed for a plurality of terminals in the area of the cell or the beam, and individual Doppler shift correction is performed for a plurality of terminals.

A radio communication system according to one embodiment of the present disclosure includes, for example, at least terminal 300a, terminal 300b, and base station 400. The radio communication system may be, for example, a satellite-based communication system in an NTN environment, or another radio communication system. Terminal 300a, terminal 300b, and base station 400 are one examples of the communication apparatus.

For example, terminal 300a may be a GNSS terminal, and terminal 300b may be a non-GNSS terminal. In addition, base station 400 may communicate with terminal 300a and terminal 300b via a satellite, for example.

Exemplary Configuration of Terminal 300a

For example, terminal 300a (e.g., GNSS terminal) may calculate, based on the positional information of the GNSS terminal obtained by the GNSS, a Doppler shift caused depending on the terminal position, and transmit an uplink signal at a frequency corrected for the Doppler shift. In addition, terminal 300a may perform frequency adjustment using, for example, a cell-specific frequency adjustment value, and transmit an uplink signal.

Figure 10:
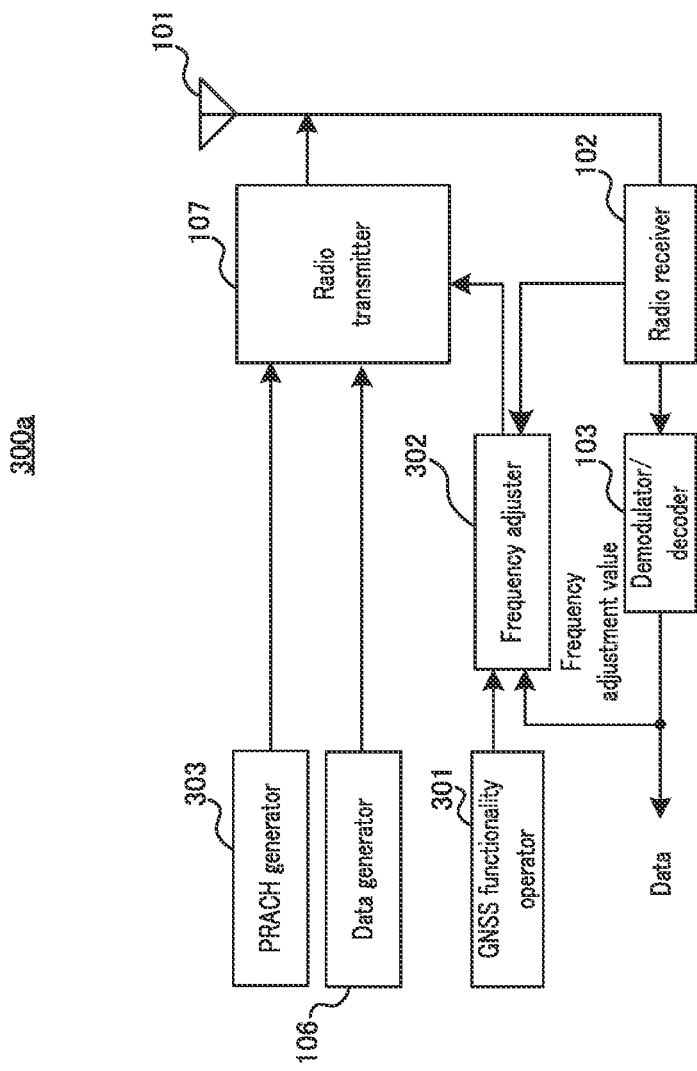
FIG. 10 illustrates one example of a configuration of a terminal according to Embodiment 2.

FIG. 10 is a block diagram illustrating an exemplary configuration of terminal 300a (for example, a GNSS terminal) according to the present embodiment. In FIG. 10, the same components as those of the terminal of Embodiment 1 are denoted by the same reference numerals.

GNSS functionality operator 301 may obtain positional information (for example, information such as the latitude, longitude, and altitude) of terminal 300a and information such as the position, orbit, and velocity of the satellite being a communication partner by the GNSS functionality such as a Global Positioning System (GPS), for example. In addition, GNSS functionality operator 301 may calculate the relative velocity between terminal 300a and the satellite, for example, based on the obtained information. For example, GNSS functionality operator 301 may calculate the downlink and uplink Doppler shifts at the position of terminal 300a based on the calculated relative velocity.

For example, the downlink Doppler shift may be a Doppler shift observed at the position of terminal 300a with respect to a signal transmitted by the satellite at a downlink carrier frequency. Further, for example, the uplink Doppler shift may be a Doppler shift observed when a signal transmitted by terminal 300a at an uplink carrier frequency reaches the satellite.

GNSS functionality operator 301 outputs, for example, frequency shift information including information relevant to the calculated Doppler shift to frequency adjuster 105. Note that GNSS functionality operator 301 may obtain, for example, orbital information called satellite ephemeris or time information in advance, so as to obtain positional information of the satellite. In addition, GNSS functionality operator 301 may obtain a high-precision frequency from a GNSS satellite, for example, and may transmit frequency information relevant to the obtained frequency to frequency adjuster 105.

For example, frequency adjuster 302 may output, to radio transmitter 107, information on the frequency (for example, the numerical value of MHz) obtained by shifting, by a frequency shift amount indicated by the frequency shift information inputted by GNSS functionality operator 301, the frequency indicated by the frequency information inputted by radio receiver 102 or the frequency indicated by the frequency information inputted by GNSS functionality operator 301.

For example, PRACH generator 303 may determine, from PRACH transmission resources available in the cell, a transmission resource of a PRACH to be transmitted by terminal 300a. For example, PRACH generator 303 may configure time and frequency resources and a Preamble number to be used for the PRACH transmission based on information on the time and frequency resources (for example, slots and resource blocks) and a Preamble number group that are indicated by base station 400 and that are available for the PRACH transmission. For example, PRACH generator 303 may configure a PRACH transmission resource configured for the GNSS terminal (for example, a resource different from a resource configured for the non-GNSS terminal).

For example, PRACH generator 303 may generate a PRACH (e.g., a PRACH preamble or msg.1) to be transmitted in the PRACH transmission resource, and may output it to radio transmitter 107.

Exemplary Configuration of Terminal 300b

For example, after transmission of the PRACH, terminal 300b (e.g., a Non-GNSS terminal) may receive, from base station 400, frequency control information including a terminal-specific (UE specific) adjustment value for correcting a Doppler shift that is a Doppler shift remaining after correcting the Doppler shift at the cell center point and occurs depending on the terminal position. For example, terminal 300b may perform frequency adjustment using a cell-specific frequency adjustment value and a terminal-specific frequency adjustment value in transmission after the PRACH, to transmit an uplink signal.

Figure 11:
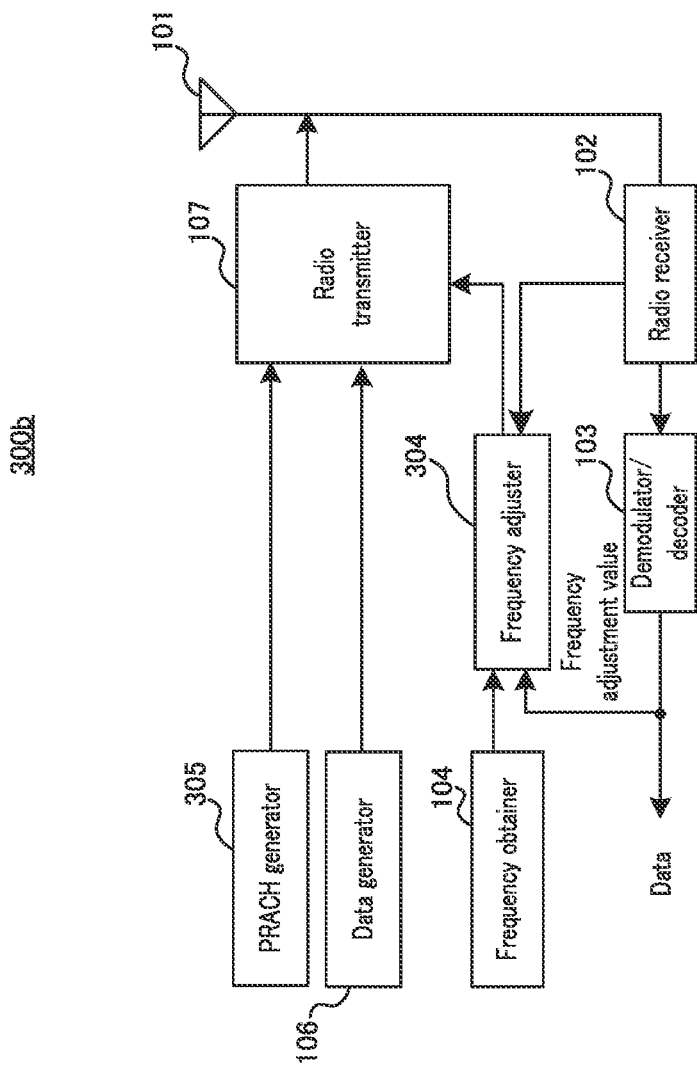
FIG. 11 illustrates one example of a configuration of the terminal according to Embodiment 2.

FIG. 11 is a block diagram illustrating an exemplary configuration of terminal 300b (for example, a non-GNSS terminal) according to the present embodiment. In FIG. 11, the same components as those of the terminal of Embodiment 1 are denoted by the same reference numerals.

Frequency adjuster 304 may, for example, perform, on a frequency based on any one of the frequency information inputted by radio receiver 102 and the frequency information inputted by frequency obtainer 104, frequency adjustment (e.g., may increase/reduce the frequency or shift the frequency) based on the frequency control information (e.g., the cell-specific and terminal-specific frequency adjustment values) received from base station 400 that is inputted by demodulator/decoder 103. Frequency adjuster 304 outputs, for example, information on the frequency of uplink transmission (for example, MHz) to radio transmitter 107.

For example, PRACH generator 305 may determine, from among PRACH transmission resources available in the cell, a transmission resource of a PRACH to be transmitted by terminal 300b. For example, PRACH generator 305 may configure time and frequency resources and a Preamble number to be used for the PRACH transmission based on information on the time and frequency resources (for example, slots and resource blocks) and a Preamble number group that are indicated by base station 400 and that are available for the PRACH transmission. For example, PRACH generator 305 may configure a PRACH transmission resource configured for the non-GNSS terminal (for example, a resource different from a resource configured for the GNSS terminal). For example, PRACH generator 305 may generate a PRACH (e.g., a PRACH preamble or msg.1) to be transmitted in the PRACH transmission resource, and may output it to radio transmitter 107.

Exemplary Configuration of Base Station 400

Figure 12:
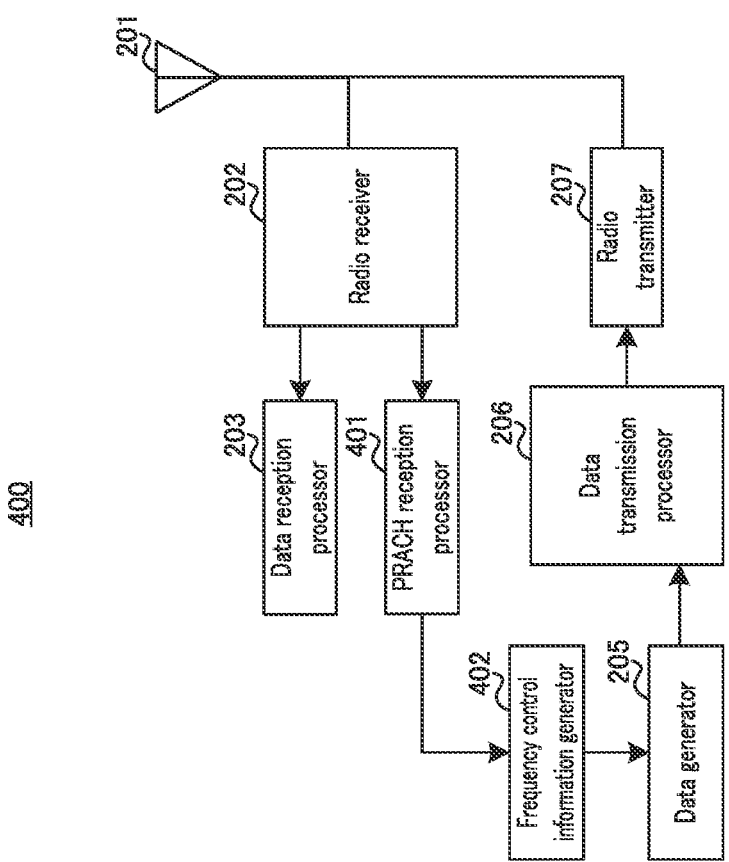
FIG. 12 illustrates one example of a configuration of a base station according to Embodiment 2.

FIG. 12 is a block diagram illustrating a configuration example of base station 400 according to the present embodiment. In FIG. 12, the same components as those of the base station of Embodiment 1 are denoted by the same reference numerals.

PRACH reception processor 401 performs, for example, a PRACH detection process to detect a PRACH signal transmitted by terminal 300a or terminal 300b. Further, for example, PRACH reception processor 401 estimates a frequency offset (frequency shift) of an uplink carrier frequency used in base station 400 from the detected PRACH signal from terminal 300a or terminal 300b, and outputs information on the estimated frequency offset to frequency control information generator 402.

Frequency control information generator 402 may generate, for example, the frequency control information (hereinafter, for example, referred to as "cell-common frequency control information") for controlling a frequency (for example, a carrier frequency) common to a cell or a beam. The cell-common frequency control information may be generated based on, for example, a Doppler shift amount calculated based on at least one of the position of the satellite, the moving direction of the satellite, the velocity of the satellite, and the beam center position on the earth surface. Further, for example, frequency control information generator 204 may generate the frequency control information for the GNSS terminal and for the non-GNSS terminal. Frequency control information generator 402 may output the generated cell-common frequency control information to data generator 205.

Further, frequency control information generator 402 may generate terminal-specific frequency control information (hereinafter, for example, referred to as "terminal-specific frequency control information") based on the frequency offset information for each terminal inputted by PRACH reception processor 401. Frequency control information generator 402 may output the generated terminal-specific frequency control information to data generator 205.

Exemplary Operation of Terminal 300a, Terminal 300b, and Base station 400

An exemplary operation of terminal 300a, terminal 300b, and base station 400 described above will be described.

Base station 400 may, for example, configure in the frequency control information, the frequency adjustment value for compensating the Doppler shift caused by the movement of the satellite. Base station 400 may configure, for example, the cell-common frequency control information and the terminal-specific frequency control information.

The cell-common frequency control information may be, for example, information for correcting a Doppler shift at a reference point in a cell or a beam by a frequency adjustment value common to the cell or the beam as in Embodiment 1.

The terminal-specific frequency control information may be, for example, information for correcting a difference between a Doppler shift at a position of a terminal (for example, terminal 300a or terminal 300b) and the Doppler shift at the reference point. In other words, the terminal-specific frequency control information may be information for correcting the residual frequency shift in the frequency correction based on the common frequency control information.

Figure 13:
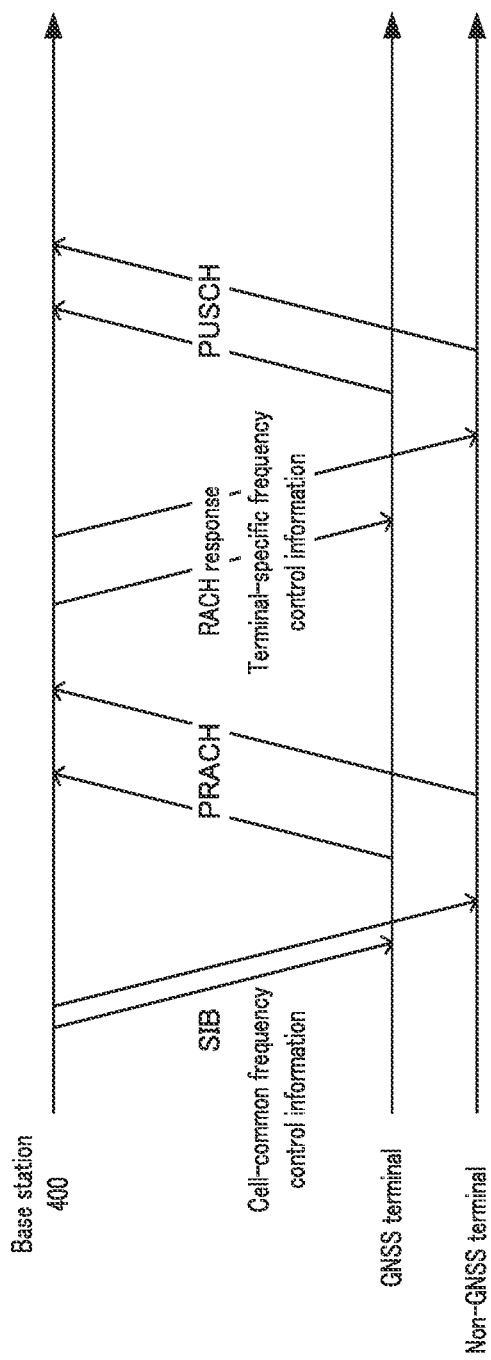
FIG. 13 is a sequence diagram illustrating an exemplary operation of the base station according to Embodiment 2, a Global Navigation Satellite System (GNSS) terminal, and a non-GNSS terminal.

FIG. 13 is a diagram illustrating an exemplary operation of base station 400, terminal 300a (for example, the GNSS terminal), and terminal 300b (for example, the non-GNSS terminal) according to the present embodiment.

Base station 400 may transmit (or broadcast or indicate) a SIB including the cell-common frequency control information, for example. The frequency adjustment value included in the cell-common frequency control information may be configured based on, for example, a transmission method (for example, presence or absence of pre-compensation) and a reception method (for example, presence or absence of post-compensation) of base station 400, and based on a frequency source (in other words, a method for obtaining a frequency source) for terminal 300a or terminal 300b as in Embodiment 1. Base station 400 may, for example, indicate the cell-common frequency control information for the GNSS terminal and the cell-common frequency control information for the non-GNSS terminal.

Operation Relevant to Non-GNSS Terminal

For example, at the time of initial access, the non-GNSS terminal may transmit a PRACH at a frequency obtained by shifting an uplink frequency by a frequency adjustment value included in the cell-common frequency control information indicated by base station 400.

The uplink frequency may be, for example, a frequency obtained from a received signal from base station 400 as in Embodiment 1, or may be a frequency obtained by at least one of (1) to (5) described above.

Here, in the frequency adjustment (or Doppler shift correction) based on the cell-common frequency control information for the non-GNSS terminal, a frequency offset (for example, a residual frequency shift) due to a difference between the terminal position and the cell center position may remain. Meanwhile, terminal 300a (GNSS terminal) can obtain the positional information of terminal 300a, for example. Thus, terminal 300a may transmit the uplink signal at a frequency corrected for the Doppler shift calculated from the positional information of terminal 300a. In other words, the frequencies of PRACH transmissions (e.g., frequency shifts) may be different between the non-GNSS terminal and the GNSS terminal. Therefore, for example, transmission resources for the PRACH signal may be resources different between the GNSS terminal (for example, the first-type terminal) and the non-GNSS terminal (the second-type terminal). Accordingly, base station 400 can appropriately receive PRACH signals transmitted by the GNSS terminal and the non-GNSS terminal.

Base station 400 may, for example, estimate the frequency offset when receiving a PRACH from the non-GNSS terminal, and generate the terminal-specific frequency control information (for example, frequency adjustment value) for compensating for the frequency offset during transmission by the non-GNSS terminal at and after the next time. Base station 400 may transmit the terminal-specific frequency control information to the non-GNSS terminal, for example, at the time of transmitting a RACH Response (e.g., RAR).

After receiving the terminal-specific frequency control information, the non-GNSS terminal may transmit an uplink signal (e.g., PUSCH) using the uplink frequency corrected using both the cell-common frequency control information and the terminal-specific frequency control information.

As described above, the non-GNSS terminal determines, for example, the transmission frequency of the PRACH signal based on the common frequency control information common to the plurality of terminals, and determines, based on the common frequency control information and the terminal-specific frequency control information, the transmission frequency used after the transmission of the PRACH signal. Thus, in the transmission after the transmission of the PRACH signal, the residual frequency shift can be corrected, and thus, for example, the non-GNSS terminal and the GNSS terminal can be multiplexed.

Operation Relevant to GNSS Terminal

For example, the GNSS terminal may perform, based on the information obtained from the GNSS, the Doppler shift correction on an uplink frequency generated from a frequency obtained from a received signal from base station 400 or a frequency obtained by the GNSS. The GNSS terminal may further shift the frequency based on the frequency adjustment value included in the common frequency control information indicated by base station 400 to the GNSS terminal, and transmit an uplink signal at the shifted frequency.

The correction of the Doppler shift depending on the terminal position may be, for example, correction for any of an uplink Doppler shift, a downlink Doppler shift, and both the uplink and downlink Doppler shifts. Which of the Doppler shift corrections to be applied may be defined in advance, may be indicated by base station 400 to the GNSS terminal (for example, broadcast by a SIB), or may be pre-configured for the GNSS terminal.

For example, with respect to any of the PRACH transmission and transmission after the PRACH transmission (e.g., PUSCH transmission), the GNSS terminal may transmit an uplink signal at the above-described frequency.

As described above, the GNSS terminal determines, for example, the transmission frequency of the uplink signal based on the common frequency control information indicated by base station 400. In other words, the GNSS terminal does not have to be based on the terminal-specific frequency control information from base station 400. Thus, the GNSS terminal can transmit the uplink signal after correcting the Doppler shift dependent on the terminal position during the PRACH transmission and during the transmission after the PRACH transmission.

The operation of terminal 300a, terminal 300b, and base station 400 has been described above.

Note that, for example, base station 400 may estimate the frequency offset for the PRACH received from the GNSS terminal as in the case of the non-GNSS terminal, and indicate the GNSS terminal of a RACH response (RAR) including the terminal-specific frequency control information corresponding to the estimated frequency offset. In this case, the GNSS terminal may use a frequency corrected based on the terminal-specific frequency control information for the transmission after PRACH transmission.

Next, the frequency adjustment in the non-GNSS terminal and the GNSS terminal will be described.

FIG. 14 is a diagram summarizing a configuration operation on frequency control information to be described later. FIG. 14 illustrates one exemplary correspondence between, on one hand, a combination between the processes of base station 400 (e.g., whether pre-compensation and post-compensation are applied or not) and the frequency obtainment method of terminal 300a or terminal 300b and, on the other hand, the frequency control information (e.g., frequency adjustment value).

Example 1

For example, base station 400 does not perform Pre-compensation during downlink transmission at a center point of a cell or a beam, and does not perform Post-compensation during uplink reception.

In this case, a frequency adjustment value (for example, correction value A) for correcting a downlink Doppler shift and a value (for example, correction value (A+B)) obtained by addition of a frequency adjustment value (for example, correction value B) for correcting an uplink Doppler shift may be configured as the frequency adjustment values of the cell-common frequency control information for the non-GNSS terminal. The non-GNSS terminal performs uplink transmission at a frequency corrected by the indicated correction value (for example, correction value (A+B)).

In addition, both of the uplink and downlink Doppler shifts are not corrected at the base station 400 side. Thus, the frequency adjustment value of the cell-common control information for the GNSS terminal may be configured to zero. In this case, the GNSS terminal performs uplink transmission at the frequency corrected for the uplink and downlink Doppler shifts at the terminal position.

Example 2

Base station 400 performs downlink transmission by, for example, pre-compensation for correcting a downlink Doppler shift at a center point of a cell or a beam, but does not perform Post-compensation at the time of uplink reception.

In this case, for example, the frequency adjustment value (for example, correction value B) for correcting an uplink Doppler shift may be configured as the frequency adjustment value of the cell-common frequency control information for the non-GNSS terminal.

In addition, for example, a minus value (for example, minus A) of a shift amount used for Pre-compensation may be configured as the frequency adjustment value of the cell-common frequency control information for the GNSS terminal. For example, the GNSS terminal may perform uplink transmission at a frequency obtained by shifting, by the aforementioned frequency adjustment value (minus A), the frequency compensated for the uplink and downlink Doppler shift at the terminal position. As described above, the GNSS terminal performs uplink transmission at a frequency corrected for a Doppler shift remaining after subtracting, from the uplink and downlink Doppler shift at the terminal position, the downlink Doppler shift (for example, correction value A) at the cell center position as corrected at the base station 400 side. Base station 400 may indicate the GNSS terminal of the shift amount (for example, A) used for Pre-compensation applied at base station 400 as the cell-common frequency control information. In this case, the GNSS terminal may perform uplink transmission at a frequency corrected (shifted) by a frequency obtained by subtracting a indicated Pre-compensation amount (for example, A) at base station 400 from the uplink and downlink Doppler shift amount at the terminal position. Alternatively, the GNSS terminal may perform the uplink transmission at a frequency shifted by the indicated correction value (for example, correction value A) (obtained by subtracting or adding the correction value) from the frequency corrected for the uplink and downlink Doppler shift amount at the terminal position.

Example 3

For example, base station 400 does not perform pre-compensation during downlink transmission, but performs uplink reception by post-compensation for correcting an uplink Doppler shift at a center point of a cell or a beam.

For example, a frequency adjustment value (for example, correction value A) for correcting a downlink Doppler shift may be configured as the frequency adjustment value of the cell-common frequency control information for the non-GNSS terminal. The non-GNSS terminal performs uplink transmission at a frequency corrected by the indicated correction value (for example, correction value A).

In addition, for example, a minus value (for example, minus B) of a shift amount used for post-compensation may be configured as the frequency adjustment value of the cell-common frequency control information for the GNSS terminal. For example, the GNSS terminal may perform uplink transmission at a frequency obtained by shifting, by the aforementioned frequency adjustment value (minus B), the frequency compensated for the uplink and downlink Doppler shift at the terminal position. As described above, the GNSS terminal performs uplink transmission at a frequency corrected for a Doppler shift remaining after subtracting, from the uplink and downlink Doppler shift at the terminal position, the uplink Doppler shift (for example, correction value B) at the cell center position as corrected at the base station 400 side. Base station 400 may indicate the GNSS terminal of the shift amount (for example, B) used for Post-compensation applied in base station 400 as the cell-common frequency control information. In this case, the GNSS terminal may perform uplink transmission at a frequency corrected (shifted) by a frequency obtained by subtracting a indicated Post-compensation amount (for example, B) in base station 400 from the uplink and downlink Doppler shift amount at the terminal position. Alternatively, the GNSS terminal may perform the uplink transmission at a frequency shifted by the indicated correction value (for example, correction value B) (obtained by subtracting or adding the correction value) from the frequency corrected for the uplink and downlink Doppler shift amount at the terminal position.

Example 4

Base station 400 performs downlink transmission by, for example, pre-compensation for correcting a downlink Doppler shift at a center point of a cell or a beam, and performs post-compensation for correcting an uplink Doppler shift at the time of uplink reception.

In this case, both of the uplink and downlink Doppler shifts are corrected at the base station 400 side. Thus, the frequency adjustment value of the cell-common control information for the non-GNSS terminal may be configured to zero. The non-GNSS terminal performs uplink transmission at an uncorrected frequency.

In addition, a minus value (for example, minus (A+B)) of the correction values (for example, correction value A and correction value B) of pre-compensation and post-compensation at base station 400 may be configured as the frequency adjustment value of the cell-common frequency control information for the GNSS terminal. In other words, a minus value of a value obtained by adding the downlink Doppler shift (for example, A [Hz]) and the uplink Doppler shift (for example, B [Hz]) may be configured as the frequency adjustment value for the GNSS terminal.

Further, for example, base station 400 may indicate an adjustment value (for example, correction value A or a minus value thereof) for correcting the downlink Doppler shift and an adjustment value (for example, correction value B or a minus value thereof) for correcting the uplink Doppler shift. Alternatively, base station 400 may indicate, for example, only the adjustment value for correcting the downlink Doppler shift, and the adjustment value for correcting the uplink Doppler shift may be determined (or calculated) from the downlink and uplink frequency differences. Note that base station 400 may indicate the GNSS terminal of each or the sum of the shift amount (for example, A) used for Pre-compensation applied at base station 400 and the shift amount (for example, B) used for Post-compensation as the cell-common frequency control information. In this case, the GNSS terminal may perform uplink transmission at a frequency corrected (shifted) by a frequency obtained by subtracting, from the uplink and downlink Doppler shift amount at the terminal position, the Pre-compensation amount (for example, A) and the Post-compensation amount (for example, B) or the sum of these amounts at base station 400 as indicated. Alternatively, the GNSS terminal may also perform uplink transmission at a frequency obtained by shifting (subtracting or adding the correction value) the sum of the indicated correction values (for example, correction value A+correction value B) from the frequency corrected for the uplink and downlink Doppler shift amount at the terminal position.

As described above, the GNSS terminal performs uplink transmission at a frequency corrected for a Doppler shift remaining after subtracting, from the uplink and downlink Doppler shift at the terminal position, the downlink and uplink Doppler shift (for example, correction value A+B) at the cell center position as corrected at the base station side.

Examples 1 to 4 have been described above.

Note that, in FIG. 14, when the non-GNSS terminal and the GNSS terminal obtain a frequency from a downlink signal received from base station 200, the frequency including an influence by the downlink Doppler shift is used. Thus, a value (for example, correction value A) for correcting the downlink Doppler shift is included as the frequency adjustment value. However, when the non-GNSS terminal and the GNSS terminal obtain a frequency from an external device different from base station 200 by the GNSS functionality or at least one of the above-described (1) to (5), a frequency not affected by the downlink Doppler shift can be used. Therefore, the frequency adjustment value does not have to include a value (for example, correction value A) for correcting the downlink Doppler shift. For example, in FIG. 14, when the non-GNSS terminal obtains a frequency from an external device different from base station 200, the frequency adjustment value may be configured to be lower by correction value A in the case where pre-compensation is not performed in base station 200 (Example 1 and Example 3) than in the case where the frequency is obtained from the received signal from base station 200. Further, for example, in FIG. 14, when the GNSS terminal obtains a frequency from an external device different from base station 200, the frequency adjustment value may be configured higher by correction value A in the case where pre-compensation is performed in base station 200 (Examples 2 and 4) than in the case where the frequency is obtained from the received signal from base station 200.

The frequency control information for the GNSS terminal may be, for example, a frequency adjustment value for a frequency corrected for the uplink and downlink Doppler shift at the terminal position. Note that base station 400 may indicate the GNSS terminal of which frequency to use that is corrected for the Doppler shift, and the GNSS terminal may perform frequency correction in accordance with the indication from base station 400. In this regard, the GNSS terminal appropriately performs frequency correction, for example, depending on base station operations and, thus, can be used with various implementations of base stations.

Note that, as in Embodiment 1, for example, when each satellite beam is emitted onto the earth surface at a fixed angle as viewed from the satellite, the beam center point also moves together with the satellite. It is thus assumed that the relationship between the position and velocity of the satellite and the beam center point does not change, and the Doppler shift does not substantially change. In this case, a fixed value may be configured in the frequency control information corresponding to each beam.

On the other hand, for example, when each satellite beam is emitted onto the same point on the earth surface while the satellite moves (for example, when beam steering is performed), the relationship between the position and the velocity of the satellite and the beam center point changes with time, and therefore, it is assumed that the Doppler shift also changes. In this case, a value for correcting the Doppler shift that varies with time may be configured in the frequency control information corresponding to each beam, or the amount of change in the Doppler shift (or correction value) may be configured. In addition, the amount of change in the amount of change in the Doppler shift (or correction value) (for example, a differential value of the amount of change) may be configured. In addition, base station 400 may indicate terminal 300 and/or terminal 300a of the coordinates of the beam center point (or the reference point for the frequency correction), and terminal 300 and/or terminal 300a may calculate the correction value for the Doppler shift based on the relationship between, on one hand, the coordinates indicated and, on the other hand, the satellite position and the satellite moving velocity.

Terminal 300 and/or terminal 300a may perform transmission after correcting the frequency of uplink transmission according to the indicated frequency correction value when the frequency correction value is indicated as the frequency control information (the frequency correction value estimated from the amount of change when the amount of change in the correction value is also indicated), or may perform transmission after correcting the frequency of the uplink transmission by calculating the correction value for the Doppler shift from the relationship between the indicated coordinates and the satellite position and the satellite moving velocity when the information on the coordinates of the beam center point (or the reference point for the frequency correction) is indicated as the frequency control information. In addition, when both of the frequency correction value and the coordinates of the beam center point (or the reference point for the frequency correction) are indicated, terminal 300 and/or terminal 300a may perform transmission after correcting the frequency of the uplink transmission using both of the correction values.

Note that, although the case in which both the GNSS terminal and the non-GNSS terminal exist has been described above, a case in which either one of the GNSS terminal and the non-GNSS terminal exists may be used.

As described above, in the present embodiment, for example, when transmitting an uplink signal including the PRACH, the GNSS terminal is capable of performing uplink transmission for which the Doppler shift dependent on the terminal position is corrected. On the other hand, the non-GNSS terminal is capable of performing, for example, transmission for which the Doppler shift common to the cell is corrected in PRACH transmission, and, in transmissions after the PRACH, the terminal is capable of performing transmissions for which the Doppler shift at the terminal position is corrected.

In addition, in the PRACH transmission, the GNSS terminal and the non-GNSS terminal may have different uplink signal transmission resources. Accordingly, it is possible to suppress the interference between the GNSS terminal and the non-GNSS terminal in the PRACH transmission. Further, in the transmissions after the PRACH, the GNSS terminal and the non-GNSS terminal perform the transmission for which the Doppler shift at the terminal position is corrected. It is thus possible to reduce the interference when transmissions are multiplexed between the GNSS terminal and the non-GNSS terminal.

In addition, base station 400 configures the frequency adjustment value according to the correction processing at the base station 400 side. It is thus possible to receive from the terminal a signal with a frequency in which the uplink and downlink Doppler shifts are appropriately corrected, regardless of the correction processing performed at the base station 400 side. It is thus possible to reduce interference caused by the frequency shift.

Embodiments of the present disclosure have been described above.

In the above-described embodiments, the satellite is not limited to the LEO in which satellites move with respect to the earth's surface, and the present disclosure is also applicable to geostationary satellites (for example, Geosynchronous Earth Orbit (GEO) satellites), medium orbit satellites (Medium Earth Orbit (MEO) satellites), or high orbit satellites (Highly Elliptical Orbit (HEO) satellites). Further, one exemplary embodiment of the present disclosure may be applied to non-terrestrial communication such as that performed by a HAPS or a drone base station. In addition, one exemplary embodiment of the present disclosure is not limited to satellite communication, and the same effect can be obtained even when the present disclosure is applied in an environment in which a terminal or a base station moves at high velocity so that a high Doppler shift occurs, for example.

Also, when it is desired to perform Doppler shift correction as in the case of LEO satellites, the frequency adjustment of the above-described embodiment may be performed. In other words, in a case where the Doppler shift correction does not need to be performed, the frequency adjustment of the above-described embodiment does not need to be performed. For example, the terminal may discriminate whether or not to perform Doppler shift correction based on satellite information (for example, information identifying a satellite) broadcast by the base station, or based on information about a satellite being a communication partner that is configured in advance for the terminal.

Further, in the above-described embodiments, the mode of the satellite communication may be a mode in which the function of the base station exists on the satellite (for example, "regenerative satellite"), or a mode in which the function of the base station exists on the ground and the satellite relays the communication between the base station and the terminal (for example, "transparent satellite"). In other words, for example, in one exemplary embodiment of the present disclosure, the downlink and uplink may be links between a terminal and a satellite or links via a satellite.

Further, in the above-described embodiments, the signals of the terminals may be frequency-multiplexed and transmitted by Orthogonal Frequency Division Multiplexing (OFDM) or Discrete Fourier Transform-spread-OFDM (DFT-S-OFDM), or may be transmitted by other multiplexing methods such as Frequency Division Multiplexing (FDM) or Time Division Multiplexing (TDM).

Further, in the above-described embodiments, the terminal types such as the types of the GNSS terminal and the non-GNSS terminal may be indicated to the base station by, for example, "UE capability," "Feature Group Indicator (FGI)," or other information.

Further, in the above-described embodiments, a terminal having the GNSS functionality may also operate as the above-described non-GNSS terminal, for example, in a case where the GNSS functionality is not usable, such as in a case where radio waves from a GNSS satellite cannot be received, or in a case where the GNSS functionality is not used temporarily to avoid exhaustion of batteries.

Further, in the above-described embodiments, in the above-described method (1) for "obtaining from a signal from one or more satellites being a communication partner" as the obtainment method for obtaining a frequency by the terminal, for example, the difference information between the frequency of the transmission signal of a satellite and the reference frequency (for example, the frequency of an atomic clock) is indicated to the terminal in a SIB, and the terminal may use a frequency obtained by subtracting the difference indicated in the difference information from the frequency of the received signal. For example, by using a plurality of timings or signals of a plurality of satellites, the terminal can obtain a frequency that is less affected by the Doppler shift.

Further, in the above-described embodiments, the obtainment method for obtaining a frequency used by the terminal in the uplink may be indicated by the base station to the terminal. The terminal may determine the frequency according to the indication from the base station, for example. In this case, the base station is capable of specifying the frequency to be used by the terminal, for example, based on the frequency adjustment value or the Post-compensation method to be indicated. Alternatively, the base station may configure the frequency adjustment value according to, for example, an uplink frequency obtainment method for the terminal.

Further, in the above-described embodiments, the uplink frequency obtainment method may be notified by the terminal to the base station. In this case, the base station may control, based on the notification from the terminal, the frequency adjustment value to be notified or the Post-compensation method.

Further, in the above-described embodiments, the cell-common frequency control information is not limited to that indicated to the terminal by the SIB, and may be indicated to the terminal by broadcast information different from the SIB or terminal-specific control information, for example. For example, a RACH response may include the cell-common frequency control information.

Further, in the above-described embodiments, the terminal-specific frequency control information is not limited to that indicated to the terminal by a RACH response, and may be indicated to the terminal by, for example, DCI, PDCCH or PDSCH. Further, for example, the terminal-specific frequency control information may be updated as the terminal or the satellite moves, and may be transmitted by RRC control information or MAC CE.

Further, the above-described embodiment has been described in relation to the case in which the frequency adjustment value for correcting a Doppler shift with respect to a reference point such as a beam center point is indicated to the terminal. However, the positional information such as coordinates of the reference point may be indicated to the terminal.

For example, when the terminal moves by a mobile entity such as an aircraft, a vehicle on a railway, or an automobile, the terminal may transmit an uplink signal at a frequency corrected for a Doppler shift caused by a moving velocity of the terminal (or the mobile entity). In this case, for example, the terminal may calculate the Doppler shift from the relative velocity between the satellite and the terminal based on the moving velocity of the terminal, and transmit an uplink signal at a frequency shifted by the amount of the Doppler shift.

Further, in the above-described embodiments, the base station may indicate the GNSS terminal of, for example, the presence or absence of Pre-compensation and Post-compensation at the base station and a correction target (for example, a downlink Doppler shift or an uplink Doppler shift), and the GNSS terminal may perform frequency adjustment using the terminal position based on the indication from the base station.

Further, in the above-described embodiments, at the time of handover (or beam switching), the base station may indicate the terminal of the frequency adjustment information on a destination of handover (or beam switching) in advance. This allows the terminal to correct the frequency more quickly and to be connected to the beam or base station to which the terminal is handed over. In addition, the base station may indicate the terminal of information regarding whether the cell of the handover destination is formed by a beam transmitted by the same satellite or a beam transmitted by a different satellite. Thus, the terminal is capable of knowing whether to perform the same frequency adjustment or different frequency adjustment. Accordingly, the frequency can be corrected more quickly and the terminal can be connected with the beam or the base station to which the terminal is handed over.

Further, in the above-described embodiments, when the frequency is obtained from the received signal from the base station, the frequency of the uplink transmission of the terminal means, for example, a frequency with an accuracy within a predetermined range (for example, 0.1 ppm) as compared with the frequency received from the base station, as described in 3GPP TS38.101 section 6.4.1. In addition, when the frequency obtained by the GNSS or at least one of the above-described (1) to (5) is used, the frequency of uplink transmission of the terminal means a frequency with an accuracy within a predetermined range (for example, 0.1 ppm) as compared with the frequency obtained by the GNSS or at least one of the above-described (1) to (5). In addition, when the frequency shift based on the frequency control information is performed, the frequency of the uplink transmission of the terminal means a frequency with an accuracy within a predetermined range (for example, a 0.1 ppm) as obtained on the condition that a value indicated is taken into account with respect to the frequency to be compared.

In addition, in the above-described embodiments, when the terminal performs frequency adjustment, the terminal may perform frequency adjustment within a range in which the out-of-band power specified by laws and regulations or specifications is equal to or less than a predetermined value. For example, the frequency may be adjusted so as to satisfy Out of band emission, Spectrum emission mask, Adjacent channel leakage ratio, Spurious emissions specification indicated by TS38.101-1 V15.6.0. It is thus possible to reduce the influence of the Doppler shift while satisfying the regulations or specifications. Further, for example, by performing frequency control so as to correct the difference between the Doppler shift at the position of the terminal (for example, terminal 300*a* or terminal 300*b*) and the Doppler shift at the reference point as in Examples 2 to 4 of Embodiment 2, the frequency adjustment amount at the terminal can be reduced, and the above definitions can be more easily satisfied.

Further, note that the embodiments described above have been described by taking the NTN environment (e.g., a satellite communication environment) as an example, but the present disclosure is not limited thereto. The present disclosure may be applied to other communication environments (e.g., a terrestrial cellular environment in LTE and/or NR).

Further, the term "terminal" in each of the embodiments described above may be replaced with the term "UE." Also, the term "base station" may be replaced with the term "eNodeB," "eNB," "gNodeB," or "gNB."

The expression "section" used in the above-described embodiments may be replaced with another expression such as "circuit (circuitry)," "device," "unit," or "module."

Control Signal

In one exemplary embodiment of the present disclosure, the downlink control signal (or downlink control information) may be a signal (or information) transmitted in a Physical Downlink Control Channel (PDCCH) in a physical layer, for example, or may be a signal (or information) transmitted in a Medium Access Control (MAC) or a Radio Resource Control (RRC) in a higher layer. Further, the signal (or information) is not limited to that indicated by the downlink control signal, but may be predefined in the specifications (or standard) or may be pre-configured for the base station and the terminal.

In one exemplary embodiment of the present disclosure, the uplink control signal (or uplink control information) may be, for example, a signal (or information) transmitted in a PDCCH of the physical layer or a signal (or information) transmitted in the MAC or RRC of the higher layer. Further, the signal (or information) is not limited to that notified by the uplink control signal, and may be predefined in the specifications (or standard) or may be pre-configured for the base station and the terminal. The uplink control signal may be replaced with, for example, uplink control information (UCI), 1st stage sidelink control information (SCI), or 2nd stage SCI.

Base Station

In one exemplary embodiment of the present disclosure, the base station may be a Transmission Reception Point (TRP), a cluster head, an access point, a Remote Radio Head (RRH), an eNodeB (eNB), a gNodeB (gNB), a Base Station (BS), a Base Transceiver Station (BTS), a master device, a gateway, or the like. In addition, the functions of the base station may be placed in a base station apparatus, a gateway apparatus, or a satellite apparatus. For example, a Radio Unit (RU) may be placed in the satellite, a Distributed Unit (DU) may be placed in the gateway apparatus, and a Central Unit (CU) may be placed in the base station apparatus. In a sidelink communication, a terminal may be used instead of the base station. Further, instead of the base station, a relay apparatus that relays communication between a higher node and a terminal may be used.

Uplink/Downlink/Sidelink

One exemplary embodiment of the present disclosure may be applied to, for example, any of an uplink, a downlink, and a sidelink. For example, one exemplary embodiment of the present disclosure may be applied to a Physical Uplink Shared Channel (PUSCH), a Physical Uplink Control Channel (PUCCH), and a Physical Random Access Channel (PRACH) in the uplink, a Physical Downlink Shared Channel (PDSCH), PDCCH or a Physical Broadcast Channel (PBCH) in the downlink, or a Physical Sidelink Shared Channel (PSSCH), a Physical Sidelink Control Channel (PSCCH), a Physical Sidelink Broadcast Channel (PSBCH) in the sidelink.

Note that the PDCCH, PDSCH, PUSCH and PUCCH are one examples of a downlink control channel, a downlink data channel, an uplink data channel, and an uplink control channel, respectively. The PSCCH and PSSCH are one examples of a sidelink control channel and a sidelink data channel. Further, PBCH and PSBCH are broadcast channels, and PRACH is an exemplary random access channel.

Data Channel/Control Channel

One exemplary embodiment of the present disclosure may be applied to, for example, either of a data channel or a control channel. For example, a channel in one exemplary embodiment of the present disclosure may be replaced with any one of the PDSCH, PUSCH, and PSSCH being the data channels or the PDCCH, PUCCH, PBCH, PSCCH, and PSBCH being the control channels.

Reference Signal

In one exemplary embodiment of the present disclosure, a reference signal is a signal known to both of a base station and a mobile station, for example, and may also be referred to as a Reference Signal (RS) or a pilot signal. The reference signal may be any of a Demodulation Reference Signal (DMRS), a Channel State Information-Reference Signal (CSI-RS), a Tracking Reference Signal (TRS), a Phase Tracking Reference Signal (PTRS), a Cell-specific Reference Signal (CRS), or a Sounding Reference Signal (SRS).

Time Interval

In one exemplary embodiment of the present disclosure, the units of time resources are not limited to one or a combination of slots and symbols, but may be time resource units such as, for example, frames, superframes, subframes, slots, time slot subslots, minislots, or symbols, Orthogonal Frequency Division Multiplexing (OFDM) symbols, Single Carrier-Frequency Division Multiplexing (SC-FDMA) symbols, or other time resource units. The number of symbols included in one slot is not limited to the number of symbols exemplified in the above-described embodiments, and may be another number of symbols.

Frequency Band

One exemplary embodiment of the present disclosure may be applied to either a licensed band or an unlicensed band.

Communication

One exemplary embodiment of the present disclosure may be applied to any of communication between a base station and a terminal, communication between a terminal and a terminal (Sidelink communication, Uu link communication), and communication of a Vehicle to Everything (V2X). For example, the channel in one exemplary embodiment of the present disclosure may be replaced with the PSCCH, PSSCH, Physical Sidelink Feedback Channel (PSFCH), PSBCH, PDCCH, PUCCH, PDSCH, PUSCH, or PBCH.

In addition, one exemplary embodiment of the present disclosure may be applied to either of a terrestrial network or a network other than the terrestrial network using a satellite or a High Altitude Pseudo Satellite (HAPS) (Non-Terrestrial Network (NTN)). Further, one exemplary embodiment of the present disclosure may be applied to a terrestrial network having a larger transmission delay in comparison to a symbol length or a slot length, such as a network having a large cell size or an ultra-wideband transmission network.

Antenna Port

In one exemplary embodiment of the present disclosure, an antenna port refers to a logical antenna (antenna group) composed of one physical antennas or a plurality of physical antennas. For example, the antenna port does not necessarily refer to one physical antenna, and may refer to an array antenna including a plurality of antennas. For example, it is not defined how many physical antennas the antenna port is composed of, and the number of physical antennas may be defined as the smallest unit allowing a terminal station to transmit a Reference signal. Also, the antenna port may be defined as the smallest unit multiplied by a weight of a precoding vector.

5G NR System Architecture and Protocol Stack

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 15:
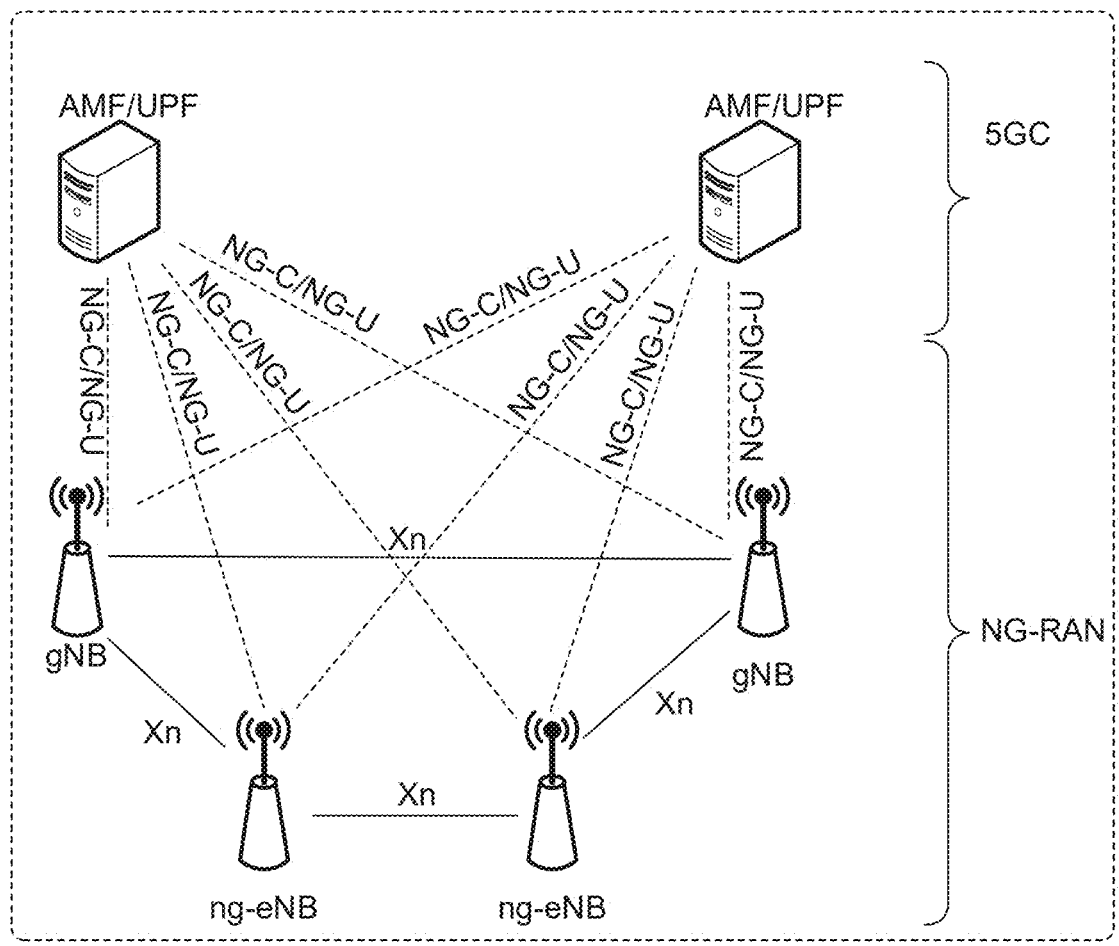
FIG. 15 illustrates an exemplary architecture of a 3GPP NR system.

For example, the overall system architecture assumes an NG-RAN (Next Generation-Radio Access Network) that includes gNBs. The gNB provides the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 15 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300), RLC (Radio link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1?10?5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

Functional Split between NG-RAN and 5GC in 5G NR

Figure 16:
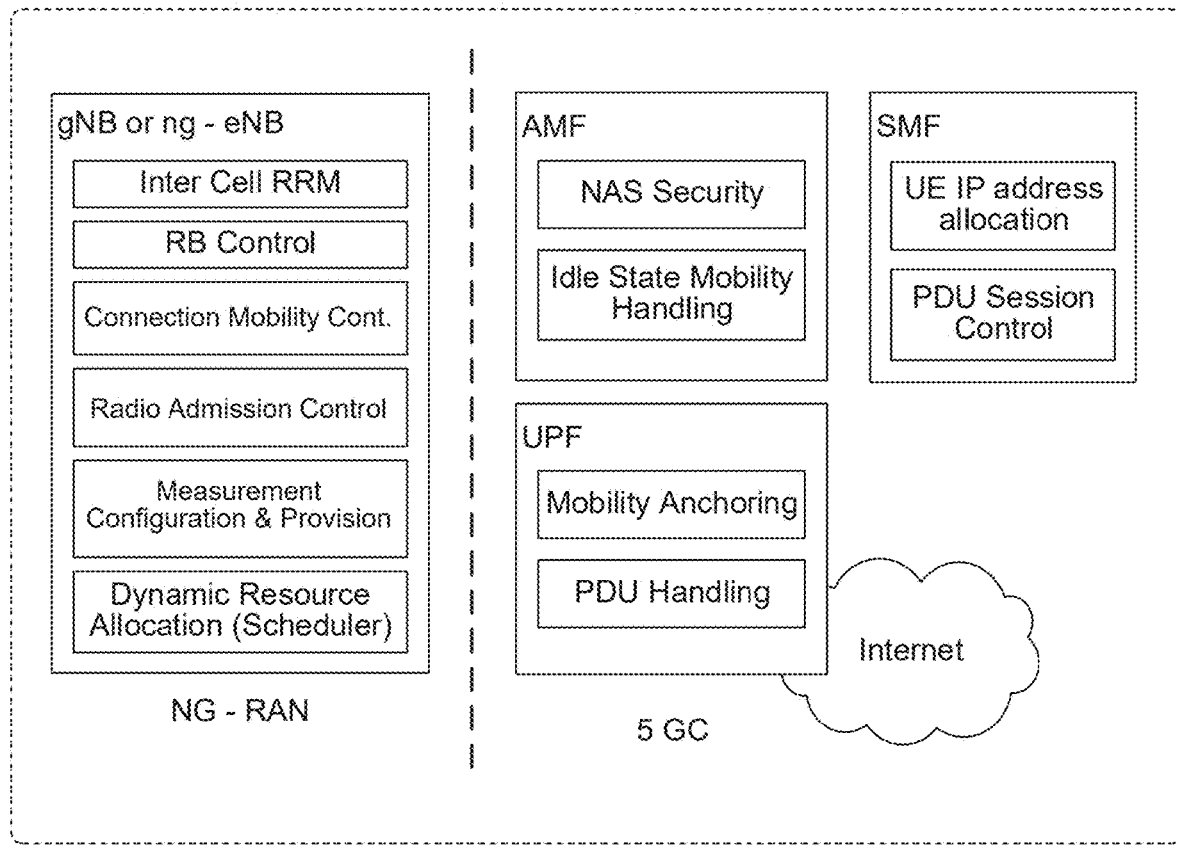
FIG. 16 is a schematic diagram illustrating functional split between Next Generation-Radio Access Network (NG-RAN) and 5th Generation Core (5GC)

FIG. 16 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:
Radio Resource Management functions such as Radio Bearer Control, Radio Admission Control, Connection Mobility Control, and dynamic allocation (scheduling) of both uplink and downlink resources to a UE;
IP header compression, encryption, and integrity protection of data;
Selection of an AMF during UE attachment in such a case when no routing to an AMF can be determined from the information provided by the UE;
Routing user plane data towards the UPF;
Routing control plane information towards the AMF;
Connection setup and release;
Scheduling and transmission of paging messages;
Scheduling and transmission of system broadcast information (originated from the AMF or an action management maintenance function (OAM: Operation, Admission, Maintenance));
Measurement and measurement reporting configuration for mobility and scheduling;
Transport level packet marking in the uplink;
Session management;
Support of network slicing;
QoS flow management and mapping to data radio bearers;
Support of UEs in the RRC_INACTIVE state;
Distribution function for NAS messages;
Radio access network sharing;
Dual connectivity; and
Tight interworking between NR and E-UTRA.

The Access and Mobility Management Function (AMF) hosts the following main functions:
Function of Non-Access Stratum (NAS) signaling termination;
NAS signaling security;
Access Stratum (AS) security control;
Inter-Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
Session Management Function (SMF) selection.

In addition, the User Plane Function (UPF) hosts the following main functions:
Anchor Point for intra-/inter-RAT mobility (when applicable);
External Protocol Data Unit (PDU) session point for interconnection to a data network;
Packet routing and forwarding;
Packet inspection and a user plane part of Policy rule enforcement;
Traffic usage reporting;
Uplink classifier to support routing traffic flows to a data network;
Branching point to support multi-homed PDU session;
QoS handling for user plane (e.g., packet filtering, gating, UL/DL rate enforcement);
Uplink traffic verification (SDF to QoS flow mapping): and
Function of downlink packet buffering and downlink data notification triggering.

Finally, the Session Management Function (SMF) hosts the following main functions:
Session management;
UE IP address allocation and management;
Selection and control of UPF;
Configuration function for traffic steering at the User Plane Function (UPF) to route traffic to a proper destination;
Control part of policy enforcement and QoS; and
Downlink data notification.

RRC Connection Setup and Reconfiguration Procedure

Figure 17:
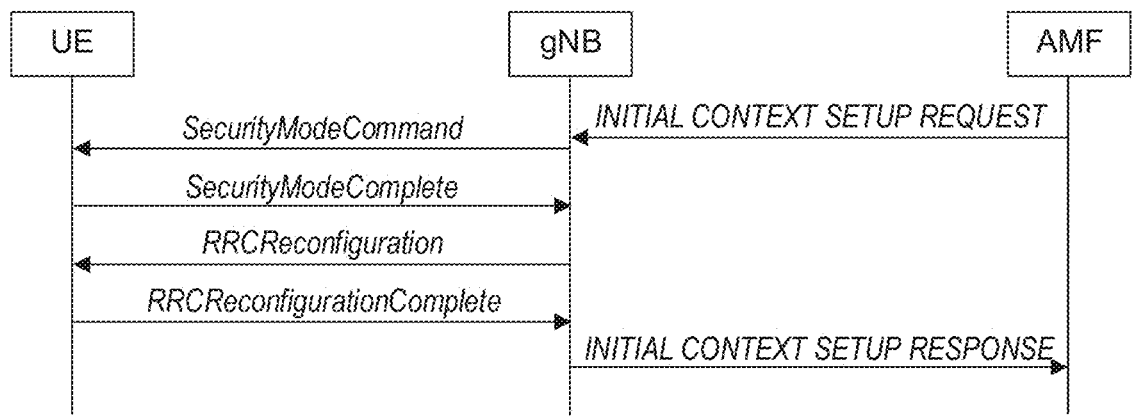
FIG. 17 is a sequence diagram of a Radio Resource Control (RRC) connection setup/reconfiguration procedure,
FIG. 18 schematically illustrates usage scenarios of enhanced Mobile BroadBand (eMBB), massive Machine Type Communications (mMTC), and Ultra Reliable and Low Latency Communications (URLLC)

FIG. 17 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer (s), DRB (s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which, in operation, transmits an initial context setup message to the gNodeB via the NG connection such that a signaling radio bearer between the gNodeB and a User Equipment (UE) is configured up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

Usage Scenarios of IMT for 2020 and Beyond

Figure 18:
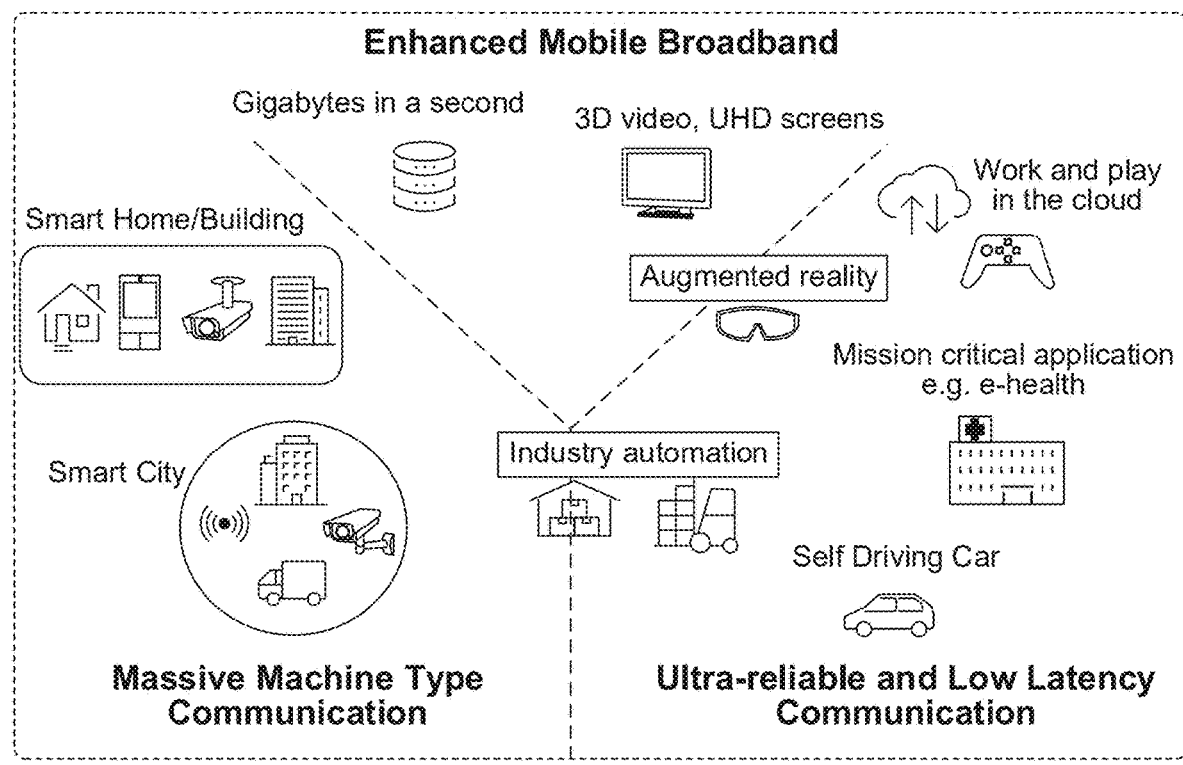

FIG. 18 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 18 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements configured by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been identified such as factory automation, transport industry and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

QoS Control

The 50 QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session, e.g., as illustrated above with reference to FIG. 17. Further, additional DRB (s) for QoS flow (s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 19:
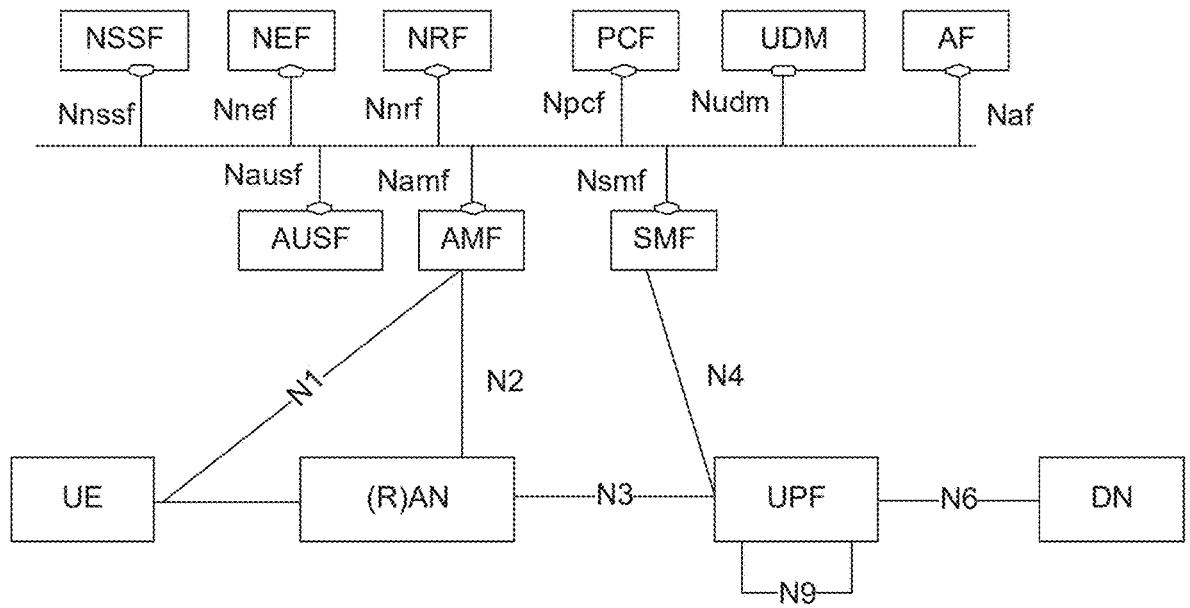
FIG. 19 is a block diagram illustrating an exemplary 5G system architecture for a non-roaming scenario.

FIG. 19 illustrates a 50 NR non-roaming reference architecture (see TS 23.501 v16.1.0, section 4.23). An Application Function (AF), e.g., an external application server hosting 5G services, exemplarily described in FIG. 18, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 19 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMMB and mMTC services to at least one of functions (for example NEF, AMF, SMF, PCF, UPF, etc.) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

When future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to one exemplary embodiment of the present disclosure includes: reception circuitry, which, in operation, receives control information for adjusting a transmission frequency of transmission in an uplink; and control circuitry, which, in operation, performs a control on the transmission frequency based on the control information.

In one exemplary embodiment of the present disclosure, the control circuitry performs the control on a frequency obtained based on a downlink signal.

In one exemplary embodiment of the present disclosure, the control circuitry performs the control on a frequency obtained from an external device different from a base station.

In one exemplary embodiment of the present disclosure, the control information is different between a first-type terminal and a second-type terminal.

In one exemplary embodiment of the present disclosure, the control information includes first information common to a plurality of terminals, and second information specific to each of the plurality of terminals, the first-type terminal performs the control based on the first information, and the second-type terminal performs the control based on the first information and the second information.

In one exemplary embodiment of the present disclosure, in the second-type terminal, the control circuitry determines a transmission frequency of a random access signal based on the first information, and determines a transmission frequency of transmission performed after transmission of the random access signal, based on the first information and the second information.

In one exemplary embodiment of the present disclosure, a transmission resource of the random access signal is different between the first-type terminal and the second-type terminal.

In one embodiment of the present disclosure, the first-type terminal is a terminal that supports Global Navigation Satellite System (GNSS) functionality, and the second-type terminal is a terminal that does not support the GNSS functionality.

In one exemplary embodiment of the present disclosure, the uplink is a link between the terminal and a satellite or a link via the satellite.

A base station according to one exemplary embodiment of the present disclosure includes: transmission circuitry, which, in operation, transmits control information for adjusting a transmission frequency of transmission in an uplink; and reception circuitry, which, in operation, receives an uplink signal at the transmission frequency determined by a control based on the control information.

A communication method according to one exemplary embodiment of the present disclosure includes steps performed by a terminal of: receiving control information for adjusting a transmission frequency of transmission in an uplink: and performing a control on the transmission frequency based on the control information.

A communication method according to an exemplary embodiment of the present disclosure includes steps performed by a base station of: transmitting control information for adjusting a transmission frequency of transmission in an uplink: and receiving an uplink signal at the transmission frequency determined by control based on the control information.

The disclosure of Japanese Patent Application No. 2020-134073, filed on Aug. 6, 2020, including the specification, drawings and abstract, is incorporated herein by reference in its entirety.

INDUSTRIAL APPLICABILITY

One aspect of the present disclosure is useful in a radio communication system.

REFERENCE SIGNS LIST 100, 300a, 300b Terminal
101, 201 Antenna
102, 202 Radio receiver
103 Demodulator/decoder
104 Frequency obtainer
105, 302, 304 Frequency adjuster
106, 205 Data generator
107, 207 Radio transmitter
200, 400 Base station
203 Data reception processor
204, 402 Frequency control information generator
206 Data transmission processor
301 GNSS functionality operator
303, 305 PRACH generator
401 PRACH reception processor

The invention claimed is:

1. A terminal, comprising:
reception circuitry, which, in operation, receives control information for adjusting a transmission frequency of transmission in an uplink; and
control circuitry, which, in operation, performs a control on the transmission frequency based on the control information, wherein,
the control information is different between a first-type terminal and a second-type terminal, the first type-terminal being a terminal that supports Global Navigation Satellite System (GNSS) functionality, and the second type-terminal being a terminal that does not support GNSS functionality,
the control information includes first information common to a plurality of terminals and second information specific to each of the plurality of terminals,
the first-type terminal performs the control based on the first information, and
the second-type terminal performs the control based on the first information and the second information.

2. The terminal according to claim 1, wherein the control circuitry performs the control on a frequency obtained based on a downlink signal.

3. The terminal according to claim 1, wherein the control circuitry performs the control on a frequency obtained from an external device different from a base station.

4. The terminal according to claim 1, wherein in the second-type terminal,
the control circuitry determines a transmission frequency of a random access signal based on the first information, and determines a transmission frequency of transmission performed after transmission of the random access signal, based on the first information and the second information.

5. The terminal according to claim 4, wherein a transmission resource of the random access signal is different between the first-type terminal and the second-type terminal.

6. The terminal according to claim 1, wherein the uplink is a link between the terminal and a satellite or a link via the satellite.

7. A base station, comprising:
transmission circuitry, which, in operation, transmits control information for adjusting a transmission frequency of transmission in an uplink; and
reception circuitry, which, in operation, receives an uplink signal at the transmission frequency determined by a control based on the control information, wherein,
the control information is different between a first-type terminal and a second-type terminal, the first type-terminal being a terminal that supports Global Navigation Satellite System (GNSS) functionality, and the second type-terminal being a terminal that does not support GNSS functionality, the control information includes first information common to a plurality of terminals and second information specific to each of the plurality of terminals,
the first-type terminal performs the control based on the first information, and
the second-type terminal performs the control based on the first information and the second information.

8. A communication method, comprising steps performed by a terminal of:
receiving control information for adjusting a transmission frequency of transmission in an uplink; and
performing a control on the transmission frequency based on the control information, wherein,
the control information is different between a first-type terminal and a second-type terminal, the first type-terminal being a terminal that supports Global Navigation Satellite System (GNSS) functionality, and the second type-terminal being a terminal that does not support GNSS functionality,
the control information includes first information common to a plurality of terminals and second information specific to each of the plurality of terminals,
the first-type terminal performs the control based on the first information, and
the second-type terminal performs the control based on the first information and the second information.

9. A communication method, comprising steps performed by a base station of:
transmitting control information for adjusting a transmission frequency of transmission in an uplink; and
receiving an uplink signal at the transmission frequency determined by control based on the control information, wherein,
the control information is different between a first-type terminal and a second-type terminal, the first type-terminal being a terminal that supports Global Navigation Satellite System (GNSS) functionality, and the second type-terminal being a terminal that does not support GNSS functionality,
the control information includes first information common to a plurality of terminals and second information specific to each of the plurality of terminals,
the first-type terminal performs the control based on the first information, and
the second-type terminal performs the control based on the first information and the second information.

\* \* \* \* \*